(12) United States Patent
Wang et al.

(10) Patent No.: US 11,879,964 B2
(45) Date of Patent: *Jan. 23, 2024

(54) SYSTEM AND METHOD FOR TRACKING EXPANDED STATE OF MOVING OBJECT WITH MODEL GEOMETRY LEARNING

(71) Applicant: Mitsubishi Electric Research Laboratories, Inc., Cambridge, MA (US)

(72) Inventors: Pu Wang, Cambridge, MA (US); Karl Berntorp, Watertown, MA (US); Yuxuan Xia, Gothenburg (SE); Hassan Mansour, Boston, MA (US); Petros Boufounos, Winchester, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 631 days.

This patent is subject to a terminal disclaimer.

(21) Appl. No.: 16/939,250

(22) Filed: Jul. 27, 2020

(65) Prior Publication Data
US 2021/0264173 A1     Aug. 26, 2021

Related U.S. Application Data

(63) Continuation-in-part of application No. 16/789,931, filed on Feb. 13, 2020, now Pat. No. 11,619,494.

(51) Int. Cl.
*G01S 13/72* (2006.01)
*G06T 7/277* (2017.01)
(Continued)

(52) U.S. Cl.
CPC ........... *G01S 13/726* (2013.01); *B60W 30/08* (2013.01); *G06F 18/214* (2023.01);
(Continued)

(58) Field of Classification Search
CPC ......... G01S 13/726; G01S 2013/93271; G01S 2013/93274; G01S 13/931; B60W 30/08;
(Continued)

(56) References Cited

U.S. PATENT DOCUMENTS

| | | | |
|---|---|---|---|
| 11,619,494 B2* | 4/2023 | Wang | G01S 13/726 701/300 |
| 2014/0324339 A1* | 10/2014 | Adam | G01S 13/726 701/519 |
| 2021/0254982 A1* | 8/2021 | Wang | G01C 21/28 |

OTHER PUBLICATIONS

Baum, et al., "Extended Object Tracking with Random Hypersurface Models," 2014, IEEE Transactions on Aerospace and Electronic Systems vol. 50, pp. 149-159. (Year: 2014).*

(Continued)

*Primary Examiner* — Donald J Wallace
(74) *Attorney, Agent, or Firm* — Gennadiy Vinokur; Hironori Tsukamoto

(57) ABSTRACT

A system and a method for tracking an expanded state of an object including a kinematic state indicative of a position of the object and an extended state indicative of one or combination of a dimension and an orientation of the object is provided herein. The system comprises at least one sensor configured to probe a scene including a moving object with one or multiple signal transmissions to produce one or multiple measurements of the object per the transmission, and a processor configured to execute a probabilistic filter tracking a joint probability of the expanded state of the object estimated by a motion model of the object and a measurement model of the object, wherein the measurement model includes a center-truncated distribution having predetermined truncation intervals. The system further comprises an output interface configured to output the expanded state of the object.

18 Claims, 33 Drawing Sheets

(51) Int. Cl.
    *G06N 20/00*    (2019.01)
    *B60W 30/08*    (2012.01)
    *G06V 20/58*    (2022.01)
    *G06F 18/214*    (2023.01)
    *G06F 18/2113*    (2023.01)
    *G06F 18/2415*    (2023.01)

(52) U.S. Cl.
    CPC ...... *G06F 18/2113* (2023.01); *G06F 18/2415* (2023.01); *G06N 20/00* (2019.01); *G06T 7/277* (2017.01); *G06V 20/58* (2022.01); *B60W 2420/52* (2013.01)

(58) Field of Classification Search
    CPC ............ B60W 2420/52; G06F 18/2113; G06F 18/214; G06F 18/2415; G06N 20/00; G06T 7/277; G06V 20/58
    See application file for complete search history.

(56) References Cited

OTHER PUBLICATIONS

Renke He, Ruixuan Wei & Qirui Zhang, "UAV autonomous collision avoidance approach," 2017, Automatika, 58:2, 195-204 (Year: 2017).*

Yuan, et al., "Extended Object Tracking using IMM Approach for a Real-World Vehicle Sensor Fusion System," 2017, IEEE International Conference on Multisensor Fusion and Integration for Intelligent Systems (MFI 2017). (Year: 2017).*

* cited by examiner

| States | Ideal Measurement Model | |
|---|---|---|
| | RM | HTG-RM |
| $p$ [m] | 0.527 | 0.365 |
| $v$ [m] | 0.097 | 0.062 |
| $\theta$ [°] | 0.879 | 0.723 |
| $l$ [m] | 2.370 | 0.207 |
| $w$ [m] | 1.007 | 0.081 |

FIG. 9C

| States | Model Mismatch | |
|---|---|---|
|  | RM | HTG-RM |
| $p$ [m] | 0.490 | 0.407 |
| $v$ [m] | 0.096 | 0.064 |
| $\theta$ [°] | 0.835 | 0.799 |
| $l$ [m] | 1.731 | 0.259 |
| $w$ [m] | 0.758 | 0.127 |

FIG. 10B

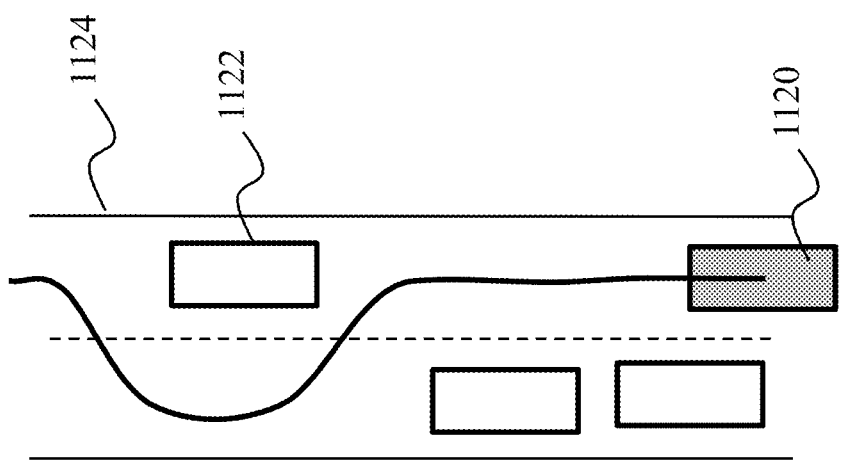

SYSTEM AND METHOD FOR TRACKING EXPANDED STATE OF MOVING OBJECT WITH MODEL GEOMETRY LEARNING

RELATED APPLICATIONS

This application is a continuation-in-part of pending application Ser. No. 16/789,931, filed Feb. 13, 2020.

TECHNICAL FIELD

This invention relates generally to automotive object tracking, and more specifically to system and method for tracking an expanded state of an object.

BACKGROUND

Control systems employed by vehicles, either autonomous vehicles or semi-autonomous vehicles, predict safe motion or path for the vehicles in order to avoid collision with obstacles, such as other vehicles or pedestrians, and the control systems also optimize some criteria associated to operations of the vehicles. Surroundings, such as road edges, pedestrians, and other vehicles, are sensed by the sensors of a vehicle. Automotive radar has manifested its role from existing ADAS (advanced driver assistance systems) to emerging autonomous driving assisted systems. Along with ultrasonic, camera and LIDAR sensors, the automotive radar assists the task of environmental sensing and understanding in all-weather conditions with affordable costs and scalable production. Particularly, automotive radar provides direct measurements of radial velocities, long operating ranges, small sizes at millimeter or sub-terahertz frequency bands, and high spatial resolutions.

The control system of the vehicle tracks object state of the other vehicles (where the object state includes kinematic states) based on the automotive radar measurements, to control the vehicle. Extended object tracking (EOT) with multiple measurements per scan has shown improved object tracking than the traditional point object tracking which includes only one measurement per scan, by augmenting the object state from kinematic-only state to both kinematic and extended states. The extended state provides dimension and orientation of the objects under tracking. To achieve this, spatial distribution (i.e. how automotive radar measurements are spatially distributed around the object) needs to be captured along with sensor noise. Current methods include a framework of a fixed set of points on a rigid body that requires a non-scalable data association between the fixed set of points and automotive radar detections even for a single object tracking. Spatial models, such as contour model and surface model, bypass the cumbersome data association step.

For automotive radar measurements, the contour model reflects the measurement distribution along contour of an object (e.g., the rigid body), and the surface model assumes the radar measurements are generated from the inner surface of a two-dimensional shape. Examples of the contour model include a simple rectangular shape and a more general star-convex shape modelled by either a random hyper surface model or a Gaussian process model. The surface model such as the Gaussian-based ellipse and hierarchical Gaussian-based ellipse model are computationally much simpler than the contour model that requires much more degrees of freedom to describe more complex shape. However, the measurements of the object are subject to noise, and reflections are received only from the surface of the object, therefore, the aforementioned models are away from the real world automotive radar measurements as the real world automotive radar measurements are observed to be allocated around the edge or surface of rigid objects with a certain volume.

Accordingly, there is a need for a system and a method for tracking both the kinematic and extended states of the object by capturing the real world automotive radar measurements.

SUMMARY

It is an object of some embodiments to provide a system and a method for tracking an expanded state of an object. The expanded state of an object includes a kinematic state indicative of a position of the object and an extended state indicative of one or combination of a dimension and an orientation of the object. Some embodiments are based on a recognition that the expanded state of the object can be estimated using a center-truncated distribution and corresponding underlying untruncated Gaussian distribution.

Some embodiments are based on an objective of tracking objects using automotive radar measurements. To that end, in some embodiments, point object tracking, in which a single measurement per scan is received from the object, is utilized to track the object. The point object tracking provides only a kinematic state (position) of the object. Further, a probabilistic filter with a measurement model having distribution of kinematic states is utilized to track the object. Some embodiments are based on expanded object tracking (EOT), in which multiple objects are tracked and multiple measurements per time step are generated corresponding to each object. The measurements are spatially structured around the object. The expanded object tracking provides both the kinematic and an extended state (dimension and orientation) of the object. The kinematic state and the extended state are combinedly referred to as the expanded state. The probabilistic filter with a measurement model having distribution of expanded states is utilized to track the object.

However, a real-world automotive radar measurement distribution shows that multiple reflections from the object are complex. Due to this complexity, designing of the measurement model becomes complex. Therefore, regular measurement models are applicable only for kinematic states and not for extended states.

To that end, in some embodiments, spatial models such as a contour model and a surface model are used to capture the real-world automotive radar measurements. However, the aforesaid spatial models are inaccurate. Some embodiments are based on recognition that real-world automotive radar measurements are distributed around edges or the surface of the object with a certain volume, which gives rise to a surface volume model. The surface volume model balances between the contour model and the surface model with more realistic features while keeping the EOT accurate. Nonetheless, the surface volume model is complex in terms of computation. To that end, some embodiments are based on objective of formulating a model in which density of distribution occurs at the ends and not at the center so that it resembles and captures the real-world automotive radar measurements.

To achieve this, a center-truncated distribution is estimated by the probabilistic filter iteratively. The center-truncated distribution is used for fitting the measurements. The center-truncated distribution is based on a truncation interval at the center and provides smaller probability for the measurements at the center of the center-truncated distribution inside of the truncation intervals, and larger probability for the measurements outside of the truncation intervals. To that end, some embodiments are based on a realization that the center-truncated distribution can be used to represent the real-world measurements.

The center-truncated distribution is a truncation of underlying untruncated Gaussian distribution according to the truncation intervals. The underlying Gaussian distribution is centered at a mean of the distribution, and variance measures the spread and width of the distribution.

To that end, some embodiments are based on an objective of estimating the center-truncated distribution that fits the measurements and, subsequently, the mean and the variance of the underlying Gaussian distribution corresponding to the estimated center-truncated distribution. Some embodiments are based on a recognition that the mean of the underlying Gaussian distribution indicates the position of the object in the expanded state and the variance of the underlying Gaussian distribution indicates the dimension and the orientation of the object in the expanded state. To that end, some embodiments are based on a recognition that using the center-truncated distribution and underlying Gaussian distribution pair, both the kinematic state and the expanded state of the object can be estimated. Also, this simplifies parameterization of tracking the expanded state. Furthermore, using the center-truncated and underlying Gaussian distribution pair, dimensionality of the computation is reduced.

Some embodiments are based on an objective of removing noise from the measurements as the measurements are subjected to the noise. In some embodiments, the probabilistic filter is configured to remove the noise from the measurements before evaluating likelihoods of noise-free sources of the measurements according to the center-truncated Gaussian distribution, such that the probabilistic filter generates the center-truncated distribution that fits the noise-free sources of the measurements. Further, the truncation intervals are determined for sources of the measurements without the noise. According to some embodiments, the measurement model is a hierarchical measurement model defining probabilistic parameters of a hidden measurement of a noise-free source for each of the measurements.

To that end, some embodiments are based on a realization that the hierarchical measurement model essentially captures not only the spatial distribution, i.e., how the automotive radar measurements are spatially distributed around the object, but also characteristics of the sensor noise. Further, a Bayesian EOT algorithm is formulated based on the hierarchical measurement model for both the kinematic and extended states. In some embodiments, the Bayesian EOT algorithm is developed according to the hierarchical measurement model by recursively predicting the expanded state and updating the expanded state and the truncation interval. The truncation interval is also referred to as the truncation bounds.

Some embodiments are based on another recognition that it is possible to offload the bound estimation in the state update step by leveraging large-scale offline training datasets in order to learn truncation bounds and other parameters associated with the measurement model from the training data.

To that end, in some embodiments, the truncation bounds including values of truncation intervals for truncating a probabilistic distribution are stored in a memory, e.g., the memory operatively connected to processor configured to execute a probabilistic filter tracking a joint probability of the expanded state. In some implementations, the memory can store a single and/or multiple combination of values of truncation intervals applicable for different situations.

Additionally, or alternatively, the memory can store other predetermined parameters of the measurement model. For example, in some embodiments, the memory stores structural geometry parameters of the measurement model learned from training data. Examples of the structural geometry parameters include truncation bounds defining an extend of the truncation intervals, an orientation of the truncation intervals with respect to an orientation of the object. Knowing the truncation bounds reduces the computational complexity of EOT tracking.

Further, in some embodiments, a control input is determined for a controller of a vehicle using a model of the vehicle with the expanded state having bounded uncertainty, and control the vehicle according to the control input. The model of the vehicle includes a motion model of the object subject to process noise and the measurement model of the object subject to measurement noise, such that one or combination of the process noise and the measurement noise bounds an uncertainty of the expanded state of the object.

Accordingly one embodiment discloses a system, for tracking an expanded state of an object including a kinematic state indicative of a position of the object and an extended state indicative of one or combination of a dimension and an orientation of the object, including at least one sensor configured to probe a scene including a moving object with one or multiple signal transmissions to produce one or multiple measurements of the object; a processor configured to execute a probabilistic filter tracking a joint probability of the expanded state of the object estimated by a motion model of the object and a measurement model of the object, wherein the measurement model includes a center-truncated distribution having truncation intervals providing smaller probability for the measurements at the center of the center-truncated distribution inside of the truncation intervals, and larger probability for the measurements outside of the truncation intervals, wherein the center-truncated distribution is a truncation of underlying untruncated Gaussian distribution according to the truncation intervals, wherein the probabilistic filter is configured to estimate the center-truncated distribution that fits the measurements and to produce a mean and a variance of the underlying Gaussian distribution corresponding to the center-truncated distribution, such that the mean of the underlying Gaussian distribution indicates the position of the object in the expanded state and the variance of the underlying Gaussian distribution indicates the dimension and the orientation of the object in the expanded state; and an output interface configured to output the expanded state of the object.

Accordingly another embodiment discloses a method for tracking an expanded state of an object including a kinematic state indicative of a position of the object and an extended state indicative of one or combination of a dimension and an orientation of the object, wherein the method uses a processor coupled to a memory storing executable instructions when executed by the processor carry out steps of the method that includes probing, by at least one sensor, a scene including a moving object with one or multiple signal transmissions to produce one or multiple measurements of the object as per the transmission; executing a probabilistic filter tracking a joint probability of the expanded state of the object estimated by a motion model of the object and a measurement model of the object, wherein the measurement model includes a center-truncated distribution having truncation intervals providing smaller probability for the measurements at the center of the center-truncated distribution inside of the truncation intervals, and larger probability for the measurements outside of the truncation intervals, wherein the center-truncated distribution is a truncation of underlying untruncated Gaussian distribution according to the truncation intervals, wherein the probabilistic filter estimates the center-truncated distribution that fits the measurements and to produce a mean and a variance of the underlying Gaussian distribution corresponding to the center-truncated distribution, such that the mean of the underlying Gaussian distribution indicates the position of the object in the expanded state and the variance of the underlying Gaussian distribution indicates the dimension and the orientation of the object in the expanded state; and outputting, via an output interface, the expanded state of the object.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 9C is a tabular column showing the root mean squared errors (RMSE) of the kinematic and extended states estimate of the object corresponding to a regular random matrix (RM) and the hierarchical truncated Gaussian random matrix (HTG-RM), with the ideal measurement model.

FIG. 10B is a table showing the RMSEs of the kinematic and extended states estimate of the object corresponding to the RM and the HTG-RM, under the model mismatch.

FIG. 11C shows a schematic of an autonomous or semi-autonomous controlled vehicle for which control inputs are generated by using some embodiments.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
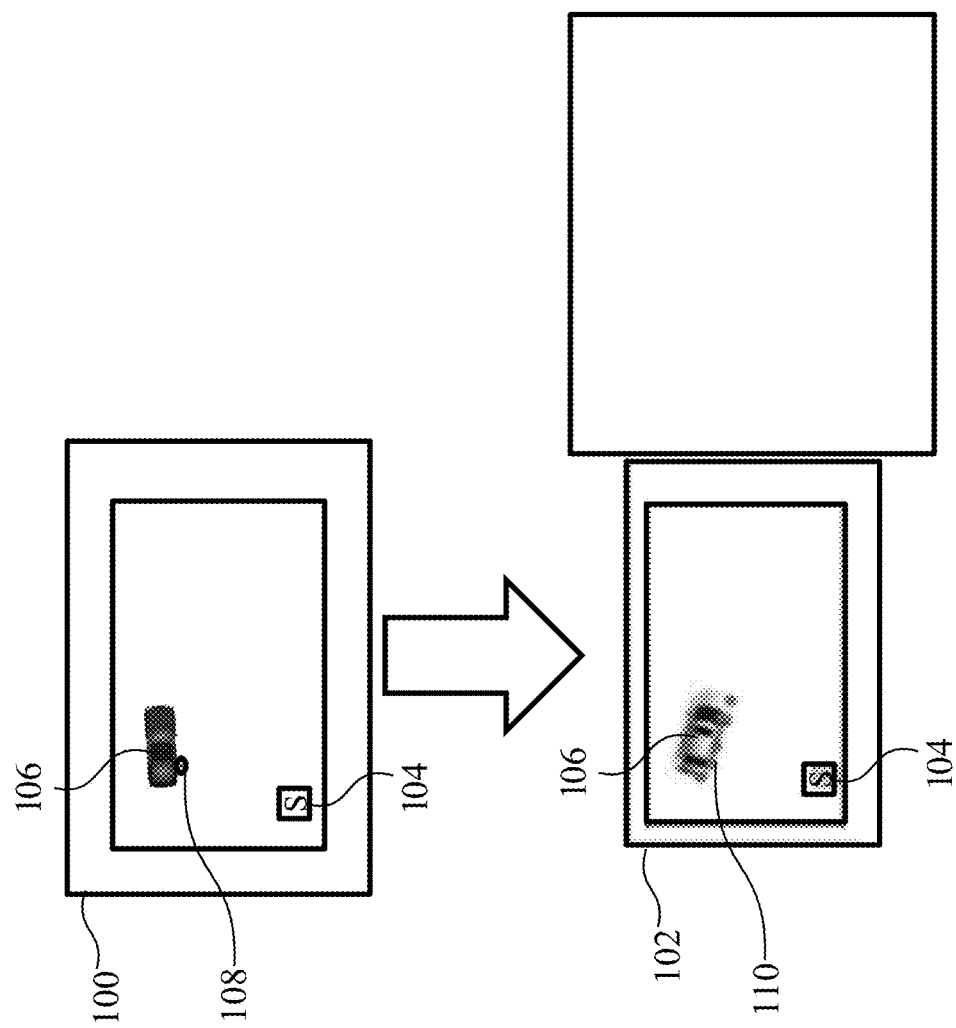
FIGS. 1A, 1B and 1C collectively show a schematic overview of some principles used by some embodiments for tracking an expanded state of an object.
Figure 1B:
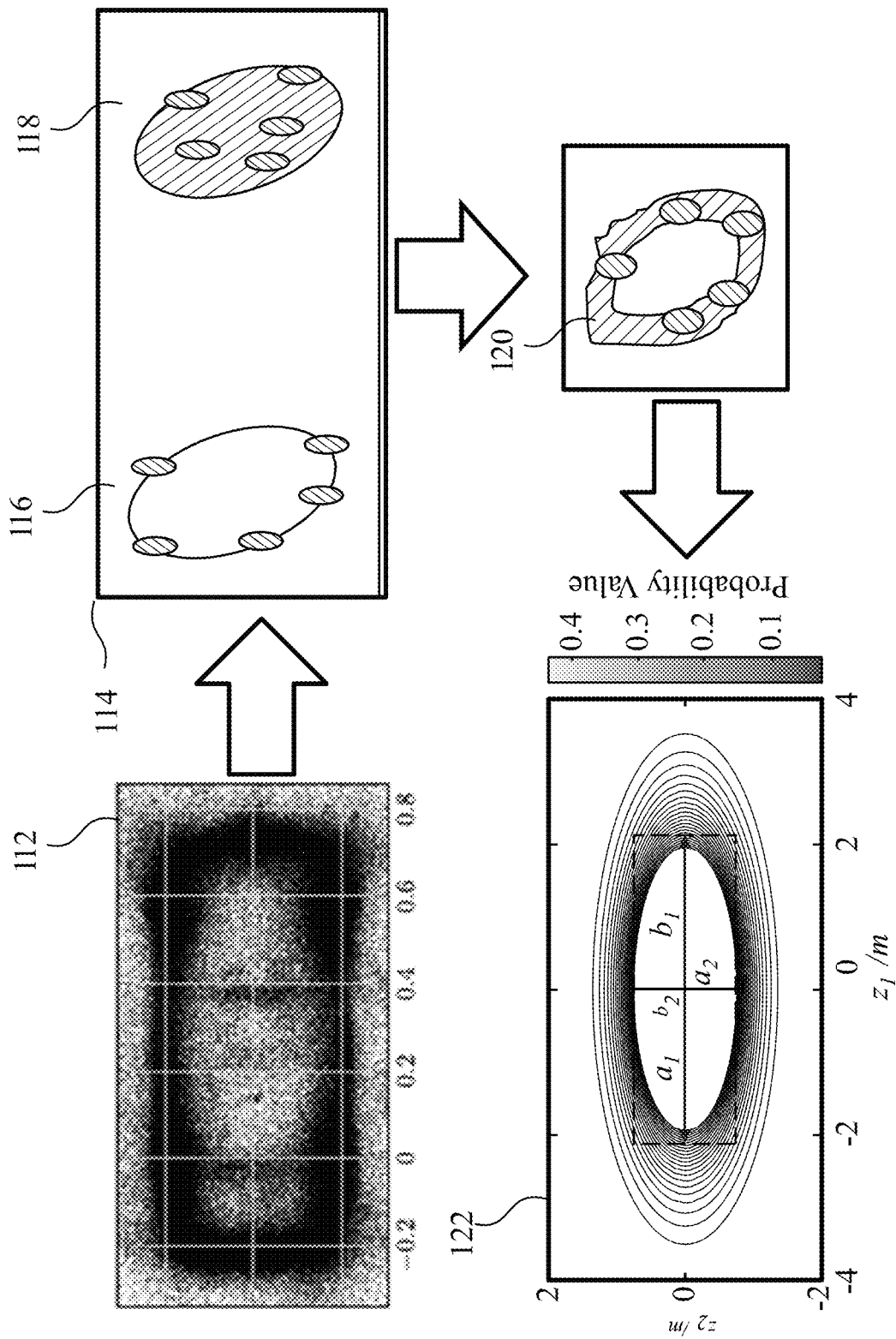
Figure 1C:
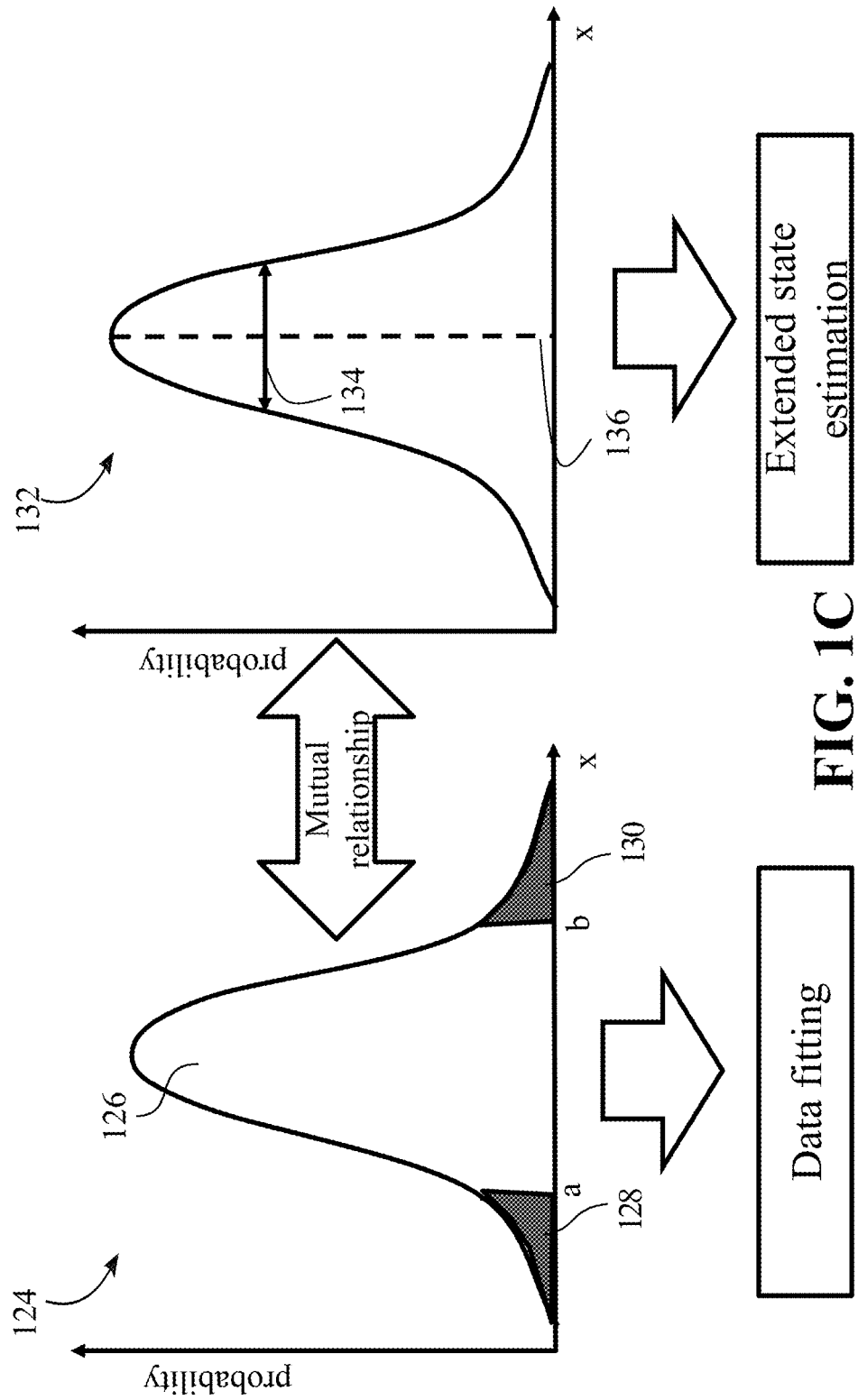

FIGS. 1A, 1B and 1C show a schematic overview of some principles used by some embodiments for tracking an expanded state of an object. A sensor 104 (for example, automotive radar) is used to track objects (such as vehicle 106). In point object tracking 100, a single measurement 108 per scan is received from the vehicle 106. The point object tracking provides only kinematic state (position) of the vehicle 106. Further, a probabilistic filter with a measurement model having distribution of kinematic states is utilized to track the vehicle 106. In extended object tracking (EOT) 102, multiple measurements 110 per scan are received. The multiple measurements 110 are spatially structured around the vehicle 106. The extended object tracking provides both the kinematic and extent state (dimension and/or orientation) of the vehicle 106. The kinematic state and the extent state are combinedly referred to as the expanded state. The probabilistic filter with a measurement model having distribution of extent states is utilized to track the vehicle 106. However, a real-world automotive radar measurement 112 distributions shows that multiple reflections from the vehicle 106 are complex. Due to this complexity, designing of the measurement model becomes complex. Therefore, regular measurement models are applicable only for kinematic states and not for expanded states.

To that end, in some embodiments, spatial models 114 such as a contour model 116 and a surface model 118 are used to capture the real-world automotive radar measurements 112. However, the aforesaid spatial models 114 are inaccurate. Some embodiments are based on a recognition that real-world automotive radar measurements are distributed around edges or the surface of the objects (the vehicle 106) with a certain volume, which gives rise to a surface volume model 120. The surface volume model 120 balances between the contour model 116 and the surface model 118 with more realistic features while keeping the EOT accurate. Nonetheless, the surface volume model 120 is complex in terms of computation. To that end, some embodiments are based on objective of formulating a model in which density of distribution occurs at the ends of one or more dimensions and not at the center as shown in 122 so that it resembles and captures the real-world automotive radar measurements 112.

To achieve this, in some embodiments, a center-truncated distribution 124 is estimated. FIG. 1C shows the one-dimensional center-truncated distribution 124 with a proper scaling/normalization and an underlying untruncated Gaussian distribution 132. The center-truncated distribution 124 is based on a truncation interval at center 126. The truncation interval, for example, is given by $a<x<b$. The center-truncated distribution 124 is used for fitting the measurements 110. Further, the center-truncated distribution 124 provides smaller probability for the measurements at the center of the center-truncated distribution 126 (i.e. inside the truncation intervals), and provides larger probability for the measurements outside of the truncation intervals 128, 130. To that end, some embodiments are based on a realization that the center-truncated distribution 124 can be used to represent the real-world automotive radar measurements 112.

The concept can naturally be extended to one or more dimensions. For example, two-dimensional center-truncated distribution for the length and width of objects, and three-dimensional center-truncated distribution for the length, width, and height of object. For the multi-dimensional center-truncated distribution, the truncation area can be in more complex shapes, other than squares or rectangles.

The center-truncated distribution 124 is a truncation of the underlying untruncated Gaussian distribution 132 with a proper normalization/scaling. The underlying untruncated Gaussian distribution 132 is obtained based on the center truncated distribution. A mean and a variance of the center-truncated distribution 124 is different from a mean 136 and variance 134 of the underlying untruncated Gaussian distribution 132. In some embodiments, the mean 136 and variance 134 of the underlying untruncated Gaussian distribution 132 can be derived from the mean and variance of the center-truncated distribution 124. Therefore, some embodiments are based on a realization that a mutual relationship exists between the center-truncated distribution 124 and the underlying untruncated Gaussian distribution 132. To that end, in some embodiments, the mean 136 and variance 134 of the underlying untruncated Gaussian distribution 132 can be derived from the mean and variance of the center-truncated distribution 124.

Some embodiments are based on a recognition that underlying untruncated Gaussian distribution 132 can be utilized for expanded state estimation of the vehicle 106. To that end, in some embodiments, the center-truncated distribution 124 fits the measurement sources and, the mean 136 and the variance 134 of the underlying untruncated Gaussian distribution 132 corresponding to the estimated center-truncated distribution 124 are estimated iteratively by the probabilistic filter. The underlying untruncated Gaussian distribution 132 is centered at the mean 136 of the distribution, and the variance 134 measures the spread, width of the distribution. The mean 136 of the underlying untruncated Gaussian distribution 132 indicates the position of the object in the expanded state and the variance 134 of the underlying Gaussian distribution 132 indicates the dimension and the orientation of the object in the expanded state.

To that end, some embodiments are based on recognition that using the center-truncated distribution and the corresponding underlying untruncated Gaussian distribution pair, the expanded state of the object can be tracked. Also, this simplifies parameterization of tracking the expanded state. Furthermore, using the center-truncated and underlying Gaussian distribution pair, dimensionality of computation is reduced as the underlying Gaussian distribution 132 is represented with less parameters than complex distribution that represents actual measurements.

Figure 2:
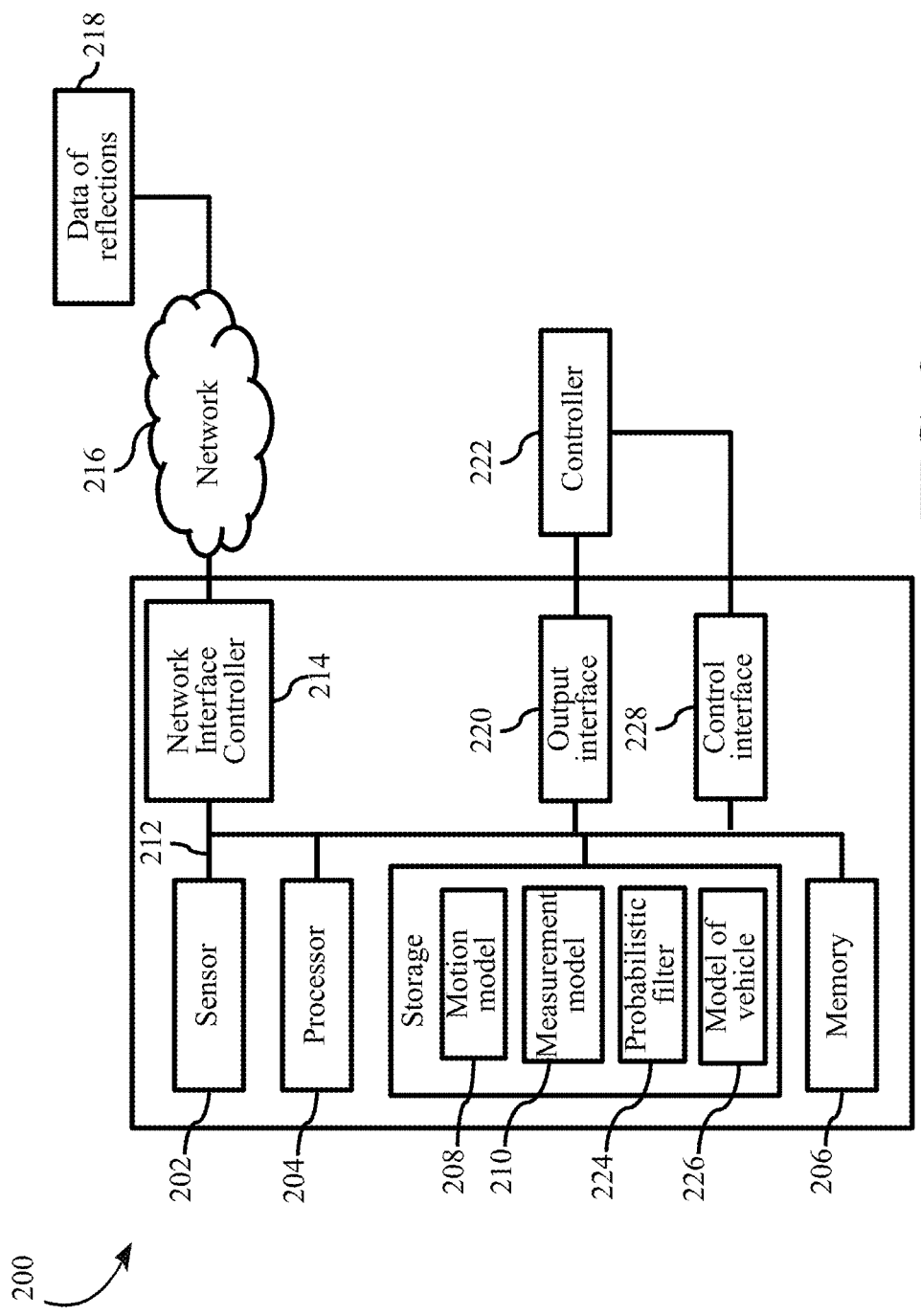
FIG. 2 shows a block diagram of a system for tracking the expanded state of the object, according to some embodiments.

FIG. 2 shows a block diagram of a system 200 for tracking the expanded state of the object, according to some embodiments. The object may be a vehicle, such as, but not limited to, a car, bike, bus, or truck. Also, the vehicle may be an autonomous or semi-autonomous vehicle. The expanded state includes the kinematic state indicative of the position of the object and the extended state indicative of the dimension and/or the orientation of the object. According to some embodiments, the kinematic state corresponds to motion parameters of the object, such as velocity, acceleration, heading and turn-rate. In some other embodiments, the kinematic state corresponds to the position of the object with its motion parameters. The system 200 may include a sensor 202 or be operatively connected to a set of sensors to probe a scene with one or multiple signal transmissions to produce one or multiple measurements of the object per transmission. According to some embodiments, the sensor 202 may be the automotive radar. In some embodiments, the scene includes a moving object. In some other embodiments, the scene may include one or more objects that include both the moving objects and stationary objects.

The system 200 can have a number of interfaces connecting the system 200 with other systems and devices. For example, a network interface controller (NIC) 214 is adapted to connect the system 200 through a bus 212 to a network 216 connecting the system 200 with the operatively connected to a set of sensors. Through the network 216, either wirelessly or through wires, the system 200 receives data of reflections of the one or multiple signal transmissions to produce the one or multiple measurements of the object per transmission. Additionally or alternatively, the system 200 includes a control interface 228 configured to transmit control inputs to a controller 222.

The system 200 includes a processor 204 configured to execute stored instructions, as well as a memory 206 that stores instructions that are executable by the processor 204. The processor 204 can be a single core processor, a multi-core processor, a computing cluster, or any number of other configurations. The memory 206 can include random access memory (RAM), read only memory (ROM), flash memory, or any other suitable memory systems. The processor 204 is connected through the bus 212 to one or more input and output devices. These instructions implement a method for tracking the expanded state of the object.

To that end, the system 200 includes a motion model 208 and a measurement model 210. In some embodiments, the system 200 includes a probabilistic filter 224. The probabilistic filter 224 is executed by the processor 204. The probabilistic filter iteratively executes the motion model 208 to predict the expanded state and the measurement model 210 to update the expanded state of the object predicted by the motion model 208. The execution of the motion model 208 yields prediction of the expanded state of the object subject to fixed values of the dimension of the object and varying an orientation of the object, such that the dimension of the object is updated only by the measurement model 210, while the orientation of the object is updated by both the motion model 208 and the measurement model 210.

Some embodiments are based on a recognition that the measurement model 210 includes the center-truncated distribution 124 having the truncation interval. In some embodiments, the center-truncated distribution 124 is a center-truncated Gaussian distribution. In some other embodiments, the center-truncated distribution 124 is a center-truncated student-t distribution. The center-truncated distribution 124 is a truncation of the underlying untruncated Gaussian distribution according to the truncation intervals. In some embodiments, the probabilistic filter 224 is configured to estimate the center-truncated distribution 124 that fits the measurements. The execution of the measurement model 210, by the probabilistic filter 224, iteratively updates previous truncation intervals determined during a previous iteration of the probabilistic filter to produce current truncation intervals that fit the expanded state predicted by the motion model. Further, the probabilistic filter 224 updates the expanded state with the measurement model 210 having the center-truncated Gaussian distribution with the current truncation intervals. According to some embodiments, the probabilistic filter 224 is one or combination of a Bayesian filter, a Kalman filter, and a particle filter. The Bayesian filter is a generic filter that can be used with different types of distribution. The Kalman filter works efficiently with Gaussian distribution. In some embodiments, the processor 204 changes the truncation intervals in response to a change of the orientation of the object with respect to the sensor 202.

Further, the probabilistic filter 224 is configured to produce the mean and the variance of the underlying Gaussian distribution corresponding to the estimated center-truncated Gaussian distribution, such that the mean indicates the position of the object in the expanded state, and the variance indicates the dimension and the orientation of the object in the expanded state. To that end, some embodiments are based on a recognition that using the estimated center-truncated Gaussian distribution and the underlying Gaussian distribution, the expanded state of the object can be estimated. In some embodiments, the execution of the measurement model 210 outputs a covariance matrix fitting the measurements. The diagonal elements of the covariance matrix define the dimension of the object, and off-diagonal elements of the covariance matrix define the orientation of the object.

Some embodiments are based on an objective of removing the noise from the measurements as the measurements are subject to noise. To that end, in some embodiments, the probabilistic filter 224 is configured to remove the noise from the measurements before evaluating likelihoods of the noise-free sources of the measurements according to the center-truncated Gaussian distribution, such that the probabilistic filter 224 generates the center-truncated distribution 124 that fits the noise-free sources of the measurements. Further, the truncation intervals are determined for sources of the measurements without the noise. According to some embodiments, the measurement model 210 is a hierarchical measurement model defining probabilistic parameters of a hidden measurement of a noise-free source for each of the measurements.

The system 200 includes a model of a vehicle 226 including the motion model 208 of the object subjected to process noise, and the measurement model 210 of the object subjected to measurement noise, such that one or combination of the process noise and the measurement noise bounds an uncertainty of the expanded state of the object. The system 200 is operatively connected to the vehicle. The processor 204 is configured to determine the control input to the controller 222 of the vehicle using the model of the vehicle 226 with the expanded state having bounded uncertainty, and control the vehicle according to the control input.

In some embodiments, the processor 204 is configured to execute the probabilistic filter 224 tracking a joint probability of the expanded state of the object estimated by the motion model 208 of the object and the measurement model 210 of the object. The joint probability is a posterior probability conditioned on the expanded state estimated during previous iterations of the probabilistic filter 224. Further, the system 200 includes an output interface 220 to output the expanded state of the object. In some embodiments, the output interface 220 is configured to output the expanded state of the object to the controller 222.

Figure 3A:
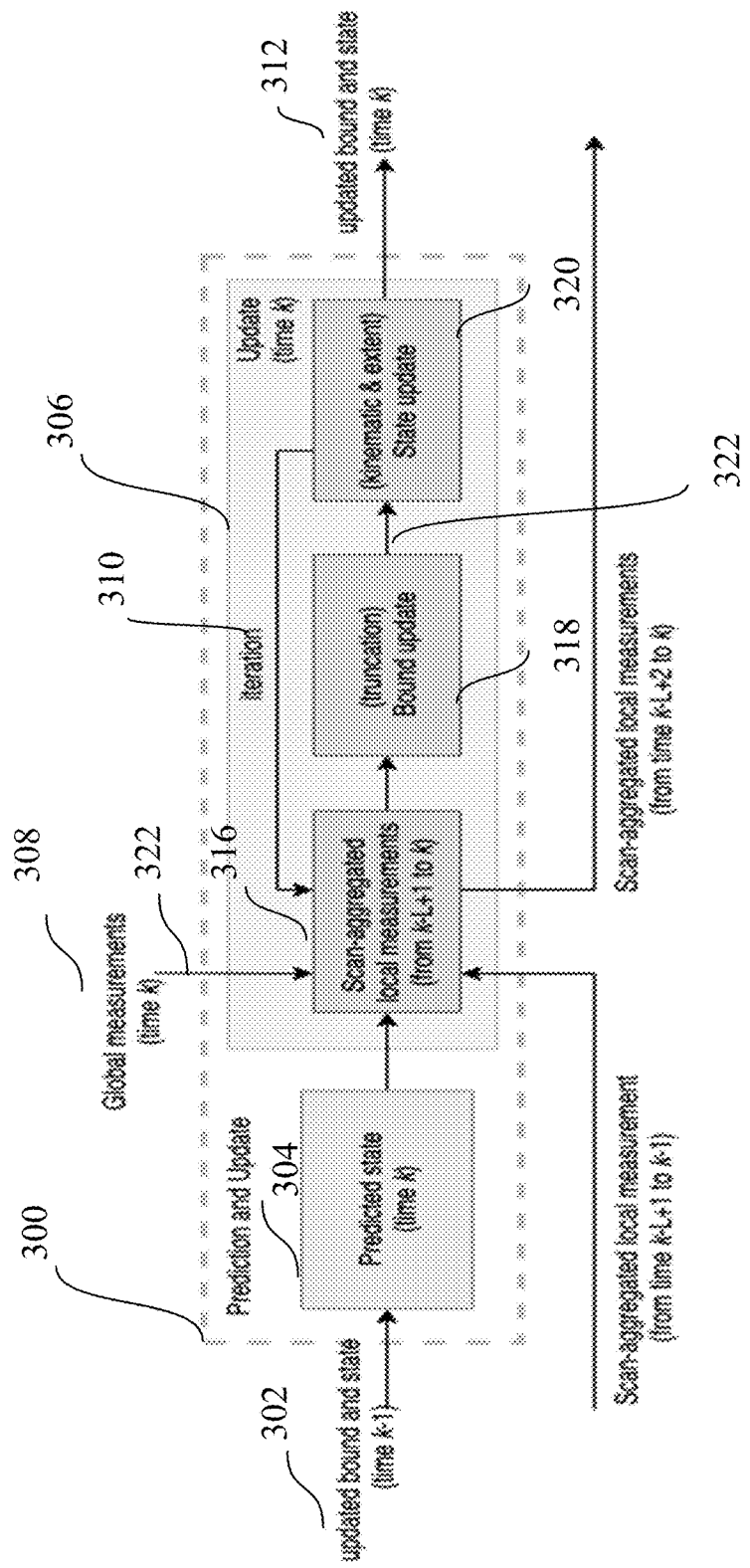
FIGS. 3A and 3B show a schematic of recursive computation of posterior density of the expanded state of the object using recursive Bayesian filtering, according to some embodiments.

FIG. 3A shows a schematic of recursive computation of posterior density of the expanded state of the object using recursive Bayesian filtering, according to some embodiments. The expanded (kinematic and extent) state is defined as $\xi_k=[x_k, X_k]$ with a random vector $x_k \in \mathbb{R}^{d_x}$ denoting the kinematic state and $X_k$ denoting the extended state. For time step k, $n_k$ measurements $Z_k \triangleq \{z_k^j\}_{j=1}^{n_k}$ are observed from automotive radar sensors.

The recursive Bayesian filtering starts 300 with an assumption of a known posterior density 302 $p(\xi_{k-1}|Z_{1:k-1})$ at time k−1. A posterior density is predicted by carrying out the posterior density prediction 304. In some embodiments, the posterior density is predicted from Chapman-Kolmogorov equation $$p(\xi_{k-1}|Z_{1:k-1}) = \int p(\xi_{k-1}|Z_{1:k-1})p(\xi_k|\xi_{k-1})d\xi_{k-1} \quad (1)$$

where a transition density $p(\xi_k|\xi_{k-1})$ is given by the object motion model. Further, the predicted posterior density is updated 306 with current measurements $Z_k$ 308 as $$p(\xi_k|Z_{1:k}) \propto p(\xi_k|Z_{1:k-1})p(Z_k|\xi_k) \quad (2)$$

where $p(Z_k|\xi_k) = \Pi_{j=1}^{n_k} p(z_k^j|\xi_k)$ is the overall measurement likelihood with $p(z_k^j|\xi_k)$ denoting the individual spatial distribution. Consequently, updated posterior density is obtained 312. Since this Bayesian filtering is recursive 310, the above steps are carried out iteratively until a termination condition is met. In each iteration 310, the posterior density in next iteration is predicted on basis of the updated predicted density of current iteration. For the state update step 306, it contains the block of scan-aggregating local measurements 316, truncation bound update 318, and the expanded state update 320. Note that the local scan aggregation step 316 is optional. In addition, if the truncation bounds are known or for saving computational complexity, the online truncation bound update 318 can be skipped as well. To that end, some embodiments are based on an objective of the object tracking by recursively computing the posterior density of the object state $p(\xi_k|Z_{1:k})$ given all past measurements $Z_{1:k}=\{Z_1, \ldots, Z_k\}$ up to time k using the Bayesian filtering. Further, in some embodiments, the expanded state $\xi_k$ with corresponding uncertainty measures can be estimated from the posterior density $p(\xi_k|Z_{1:k})$.

Figure 3B:
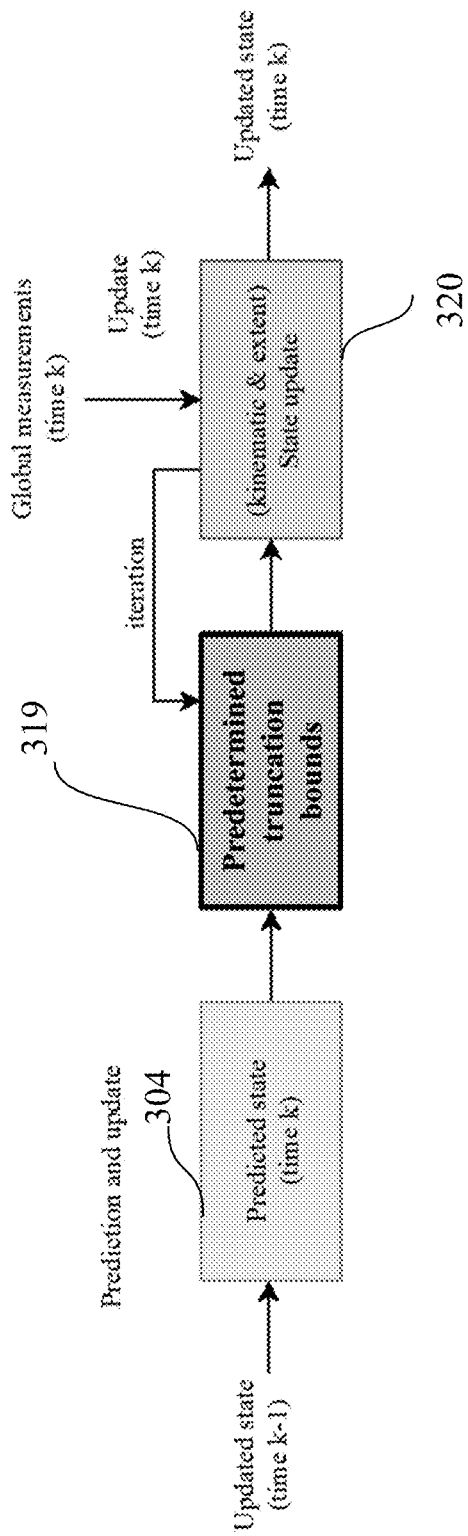

FIG. 3B shows a schematic of recursive computation of FIG. 3A with known truncation bounds according to some embodiments. In these embodiments, the truncation bounds 319 including values of truncation intervals for truncating a probabilistic distribution are stored in a memory, e.g., the memory 206, operatively connected to processor 204 configured to execute a probabilistic filter 224 tracking a joint probability of the expanded state. In different embodiments, the memory can store a single and/or multiple combinations of values of truncation intervals applicable for different situations.

Additionally, or alternatively, the memory can store other predetermined parameters of the measurement model. For example, in some embodiments, the memory stores structural geometry parameters of the measurement model learned from training data. Examples of the structural geometry parameters include truncation bounds defining an extend of the truncation intervals, an orientation of the truncation intervals with respect to an orientation of the object. Knowing the truncation bounds reduces the computational complexity of EOT tracking.

Hierarchical Measurement Model

The measurements 110 of the object are subject to noise, and reflections are received only from the surface of the object, therefore, executing the probabilistic filter with the noisy measurements may yield inaccurate estimation of expanded states and, consequently, inaccurate object tracking. To that end, the truncation intervals are to be determined for noise-free sources of the measurements (also refer to as measurement sources), so that the probabilistic filter generates the center-truncated Gaussian distribution that fits the noise-free sources of the measurements. Some embodiments are based on a realization that the probabilistic filter is configured to remove the noise from the measurements before evaluating likelihoods of the noise-free sources of the measurements according to the center-truncated Gaussian distribution.

In scenarios of small noise, some embodiments are based on a realization that the probabilistic filter is configured to evaluate likelihoods of the noisy measurements according to the hierarchical center-truncated Gaussian distribution.

To remove the noise from the measurements, some embodiments include implementation of the hierarchical measurement model that includes a hidden measurement-source variable $y_k^j$ for each observed $z_k^j$. In other words, according to some embodiments, the hierarchical measurement model provides probabilistic parameters of a hidden measurement of a noise-free source for each of the measurements. An assumption $z_k^j = y_k^j + v_k^j$ is incorporated. Therefore, mathematically defined as $$\mathcal{TN}(y_k^j; Hx_k, \rho X_k, D_k) = \frac{1_{D_k}(y_k^j)}{c_{D_k}} \mathcal{N}(y_k^j; H_{x_k}, \rho X_h) \quad (3)$$

where H is an observation matrix that selects position components (object center) in the kinematic state $x_k$, $\rho$ is a scaling factor, $D_k$ specifies the density support, and $C_{D_k}$ is normalization factor. In some embodiments, the hidden measurement-source variable $y_k^j$ is also referred to as a noise-free measurement-source variable. The probabilistic filter replaces the measurements with the hidden measurements in its execution. Thereby, the probabilistic filter generates the center-truncated Gaussian distribution that fits the noise-free sources of the measurements. In some embodiments, the hidden measurement of the noise-free source for each of the measurements is used to capture the feature of higher probabilities around the edges of the object.

Figure 4:
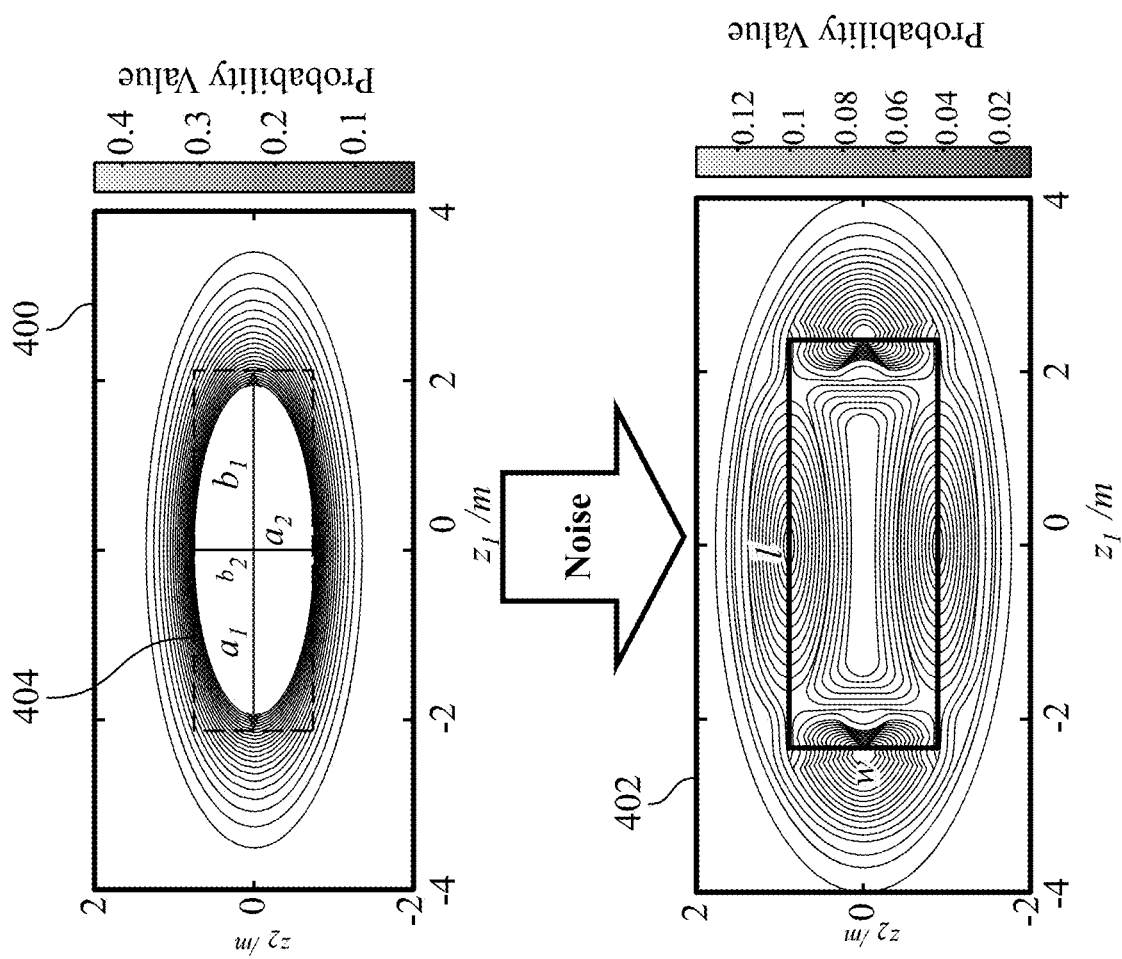
FIG. 4 illustrates an example of distributions of hidden measurement-source variable and observable measurements, according to some embodiments

FIG. 4 illustrates an example 400 of the hidden measurement-source variable $y_k^j$ where the density support is the outside of rectangle 404. The density support $D_k$ may be an arbitrary shape. For instance, rectangular shape 404 around the object center is considered. The rectangular shape 404 is described by four bounds $B_k \triangleq [a_{k,1}, a_{k,2}, b_{k,1}, b_{k,2}]^T$. In some embodiments, the bounds correspond to the interval of the center truncation. The probability density of the truncated Gaussian $p(y_k^j|\xi_k)$ 400 is centered at the origin of coordinates ($\rho=0.25$, l=4.7, w=1.8, a1=b1=2.14 and a2=b2=0.75).

The noisy measurements are used to model sensor noise. In some embodiments, the noise-free sources of the measurements are modified with the sensor noise. The sensor noise is captured by the conditional distribution $p(z_k^j|y_k^j)$ that is assumed to be a Gaussian distribution $\mathcal{N}(z_k^j; y_k^j, R_k)$ with $R_k$ denoting noise covariance matrix.

To that end, given the hierarchical measurement model (3), some embodiments are based on recognition that the resulting measurement likelihood (spatial distribution) $p(z_k^j|\xi_k)$ can be computed by integrating the measurement-source variable $$p(z_k^j|\xi_k) = \int p(z_k^j|y_k^j)p(y_k^j|\xi_k)dy_k^j = \frac{\int_{D_k} \mathcal{N}(z_k^j; y_k^j, R_k)\mathcal{N}(y_k^j; H_{x_k,\rho}X_k)dy_k^j}{c_{D_k}} \quad (4)$$

The above measurement likelihood (4) leads to the following overall measurement likelihood $p(Z_k|\xi_k) = \Pi_{j=1}^{n_k} p(z_k^j|\xi_k)$ which can be used in (2) for the update step 306. FIG. 4 illustrates the resulting measurement likelihood 402 $p(z_k^j|\xi_k)$ with $R_k=\text{diag}([0.09, 0.09])$. The hierarchical spatial distribution pushes the measurement likelihood away from the center with a high resemblance to the distribution of the real-world automotive radar measurements. Further according to some embodiments, hierarchical truncated model is flexible to describe partially observed radar measurements due to self-occlusion (e.g., only observe the rare part of the car).

Figure 5A:
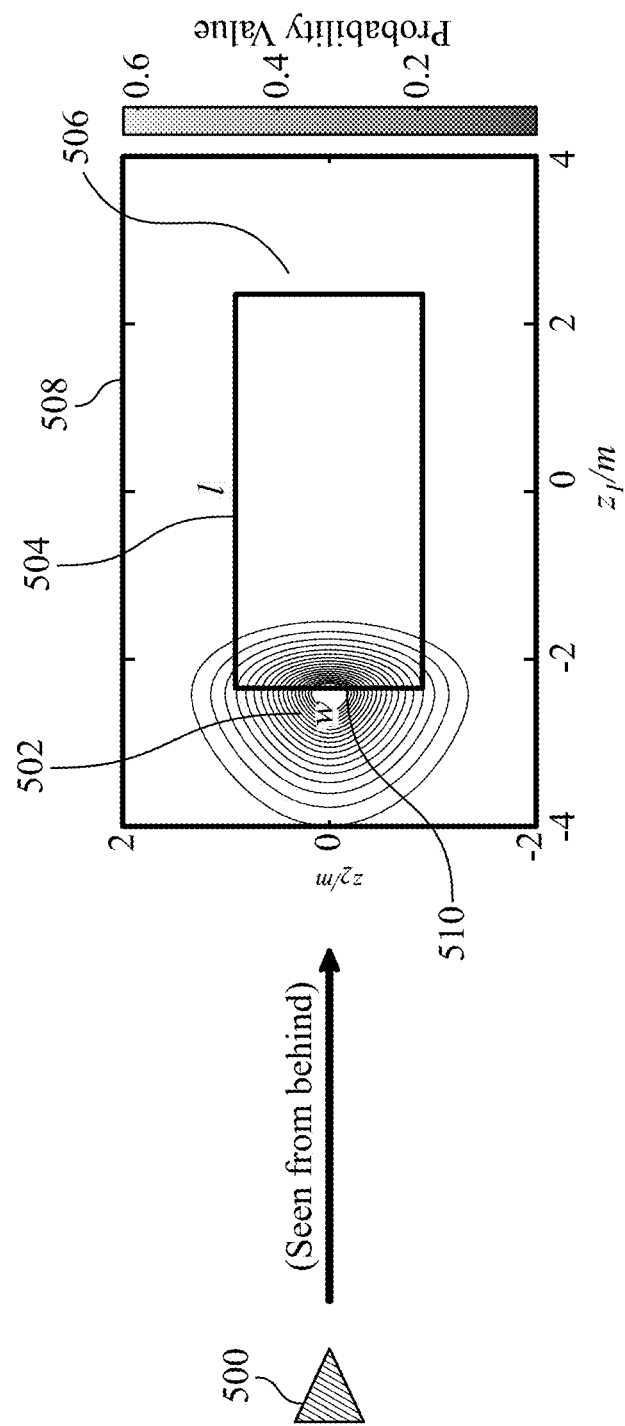
FIG. 5A illustrates an exemplary truncation interval adaptation when the object is facing sensor with its front or back side, according to some embodiments.

FIG. 5A illustrates an exemplary truncation interval adaptation when the object is a facing sensor 500 with its front 506 or back side 502, according to some embodiments. For instance, consider the object is a vehicle (e.g., the vehicle 106) of a length "l" 504 and a width w 510, and is oriented such that its back side 502 is facing the sensor 500. The sensor 500 obtains measurements corresponding to a partial view of the vehicle i.e. seen from behind. The truncation interval, for example, is given by a<x<b. In some embodiments, the truncation interval includes an open-ended interval ending in infinity to reflect the orientation of the object with respect to the sensor 500, for example, a<x<∞. In some other embodiments, the truncation interval includes an open-ended interval ending at a maximum value, for example, a<x<$n_{max}$. For the aforementioned orientation (seen from behind), the truncation interval for the length 504 of the vehicle ends in the infinity on an opposite side 506 (front side) of the vehicle with respect to the sensor 500. Subsequently, corresponding probability density 508 is determined. Alternatively, in some embodiments, the truncation interval for the length 504 of the vehicle ends at the maximum value on the opposite side 506 (front side) of the vehicle with respect to the sensor 500 and corresponding probability density can be determined.

Figure 5B:
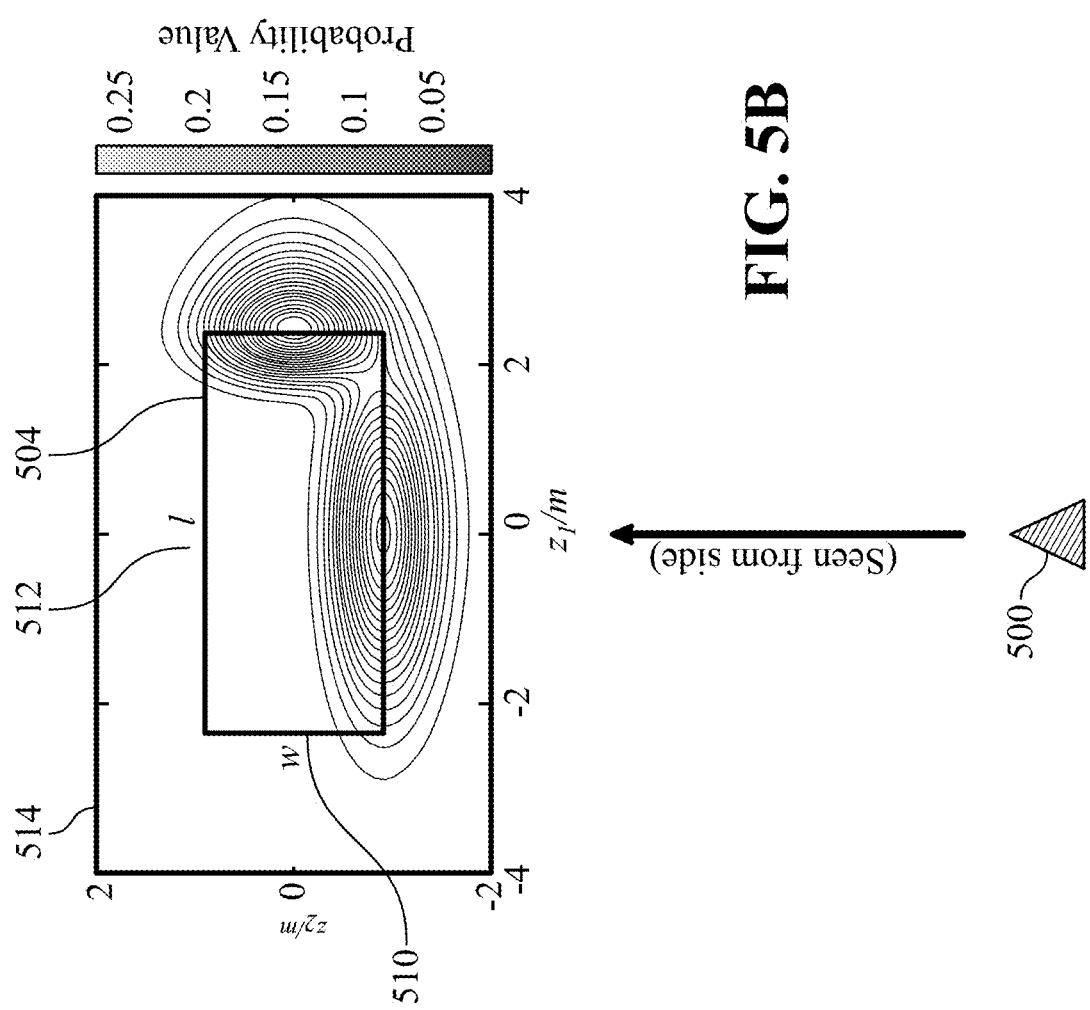
FIG. 5B illustrates an exemplary truncation interval adaptation when the object is oriented sidewise with respect to the sensor, according to some embodiments.

FIG. 5B illustrates an exemplary truncation interval adaptation when the object is oriented sidewise with respect to the sensor 500, according to some embodiments. For instance, consider the object same as the vehicle contemplated in FIG. 5A but oriented sidewise with respect to the sensor 500. The sensor 500 obtains measurements corresponding to the partial view of the vehicle i.e. seen from a side. In such a case, the truncation interval for the width 510 of the vehicle ends in the infinity on an opposite side 512 of the vehicle with respect to the sensor. Subsequently, corresponding probability density 514 is determined. Alternatively, in some embodiments, the truncation interval for the width 510 of the vehicle ends at a maximum value on the opposite side 512 of the vehicle with respect to the sensor. To that end, some embodiments are based on a recognition that the hierarchical truncated model is flexible to describe not only completely observed radar measurements but also the partially observed radar measurements.

Extended Object Tracking (EOT) Algorithm

A Bayesian EOT algorithm is formulated based on the hierarchical measurement model for both the kinematic and extended states. The Bayesian EOT algorithm is also referred to as the hierarchical truncated Gaussian random matrix (HTG-RM) algorithm. In some embodiments, the Bayesian EOT algorithm is developed according to the hierarchical measurement model by recursively predicting the expanded state and updating the expanded state and the truncation interval. The truncation interval is also referred to as the truncation bounds. Similar to a regular random matrix-based approach, it is assumed that both predicted and updated expanded state densities share a factorized form of kinematic and extended states $$p(\xi_k | Z_{1:k*}) \approx p(x_k | Z_{1:k*}) p(X_k | Z_{1:k} *) = \qquad (5)$$

$$\mathcal{N}(x_k; m_{k|k*}, P_{k|k*}) \mathcal{IW}(X_k; v_{k|k*}, V_{k|k*}),$$

where k*=k−1 is for the expanded state prediction and k*=k is for the expanded state update. In other words, the kinematic state $x_k$ is Gaussian distributed with predict/update mean $m_{k|k*}$ and covariance matrix $P_{k|k*}$, while the extended matrix $X_k$ is inverse Wishart (IW) distributed with $v_{k|k*}$ degrees of freedom and the scale matrix $V_{k|k*}$. These associated parameters {m, P, v, V}$_{k|k-1}$ for prediction and {m, P, v, V}$_{k|k*}$ for update are determined. The Bayesian EOT algorithm involves recursively predicting the expanded state and updating the expanded state and the truncation interval.

Prediction of Expanded State

Figure 6:
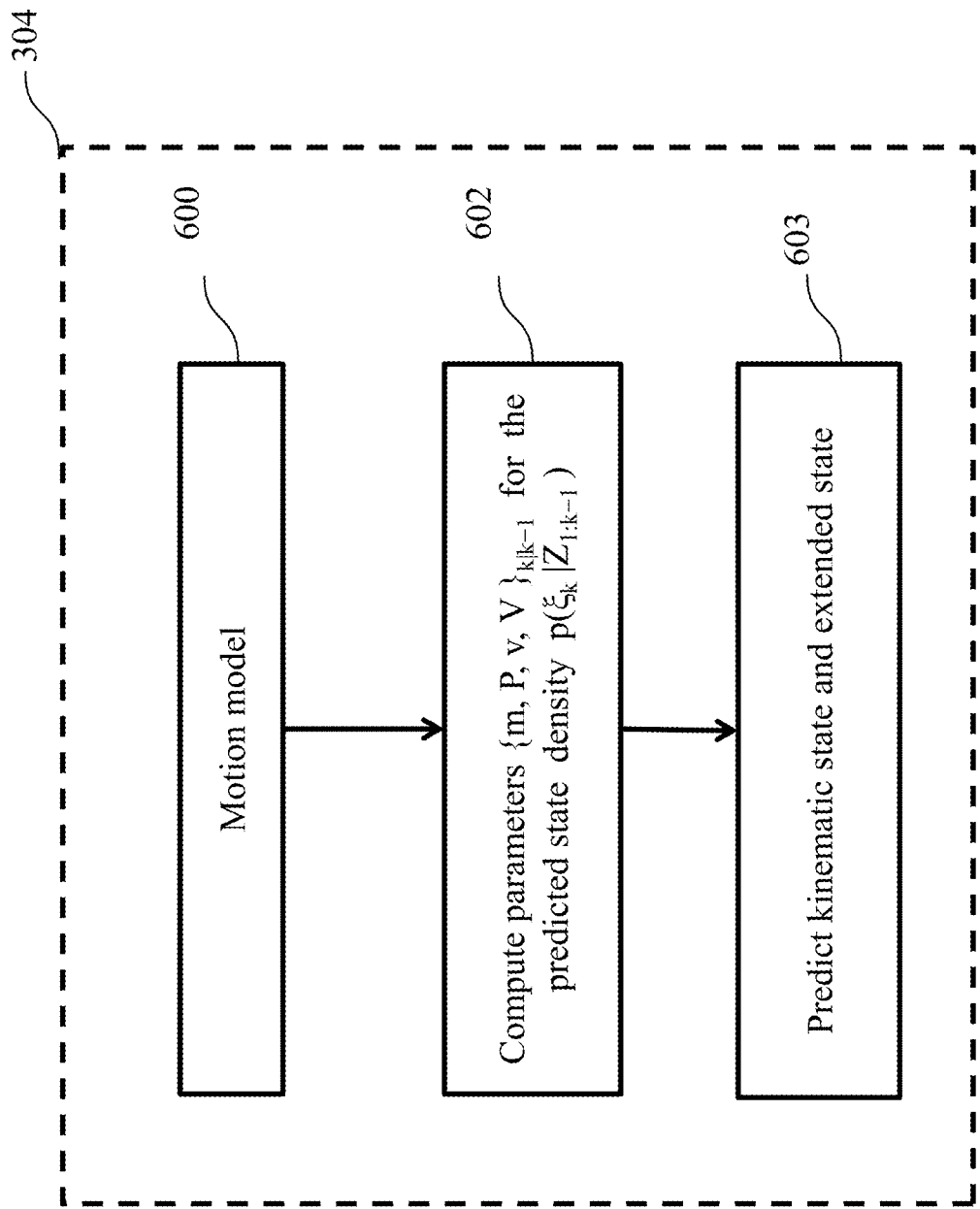
FIG. 6 shows a schematic of expanded state prediction step, according to some embodiments.

FIG. 6 shows a schematic of the expanded state prediction step 304, according to some embodiments. Given a motion model 600

$$p(\xi_k | \xi_{k-1}) \approx p(x_k | x_{k-1}) p(X_k | X_{k-1}) = \qquad (6)$$

$$\mathcal{N}(x_k; g(x_{k-1}), Q_{k-1}) \mathcal{IW}\left(X_k; n_{k-1}, \frac{E_{x_{k-1}} X_{k-1} E_{x_{k-1}}^T}{n_{k-1}}\right)$$

where g(•) is a kinematic motion model, $Q_{k-1}$ is the covariance matrix of process noise $w_{k-1}$, and $E_x$ denotes a corresponding transformation matrix (e.g., the identity matrix or a rotation matrix depending on $x_{k-1}$). Given that the posterior density $p(\xi_{k-1}|Z_{1:k-1})$ shares the same form of (5) and the transition probability of (6), the associated parameters {m, P, v, V}$_{k|k-1}$ are computed, by the processor 204, for the predicted state density $p(\xi_k|Z_{1:k-1})$ 602. The associated parameters {m, P, v, V}$_{k|k-1}$ for the predicted state density $p(\xi_k|Z_{1:k-1})$ are given as $$m_{k|k-1} = g(m_{k-1|k-1}), G_k = \nabla_x g(x)|_{x=m_{k-1|k-1}}, \qquad (7a)$$

$$P_{k|k-1} = G_k P_{k-1} G_k^T + Q_k, \qquad (7b)$$

$$v_{k|k-1} = 6 + e^{-T_s/\tau}(v_{k-1|k-1} - 6), \qquad (7c)$$

$$V_{k|k-1} = e^{-T_s/\tau} E(m_{k-1|k-1}) V k_{-1|k-1} E^T(m_{k-1}), \qquad (7d)$$

where $T_s$ is sampling time and τ is a maneuvering correlation constant. In some embodiments, the kinematic state prediction 603 in (7a) and (7b) follows prediction step of the standard Kalman filter (KF) if g is a linear model or the extended KF when g is nonlinear. The extended state prediction 603 is given by (7c) and (7d). In some other embodiments, one of Bayesian filter or a particle filter is utilized instead of Kalman filter for the kinematic and extended states prediction. To that end, some embodiments are based on recognition that the probabilistic filter, which is executed by the processor 204, iteratively executes the motion model to predict the expanded state.

Update of Expanded State

Figure 7A:
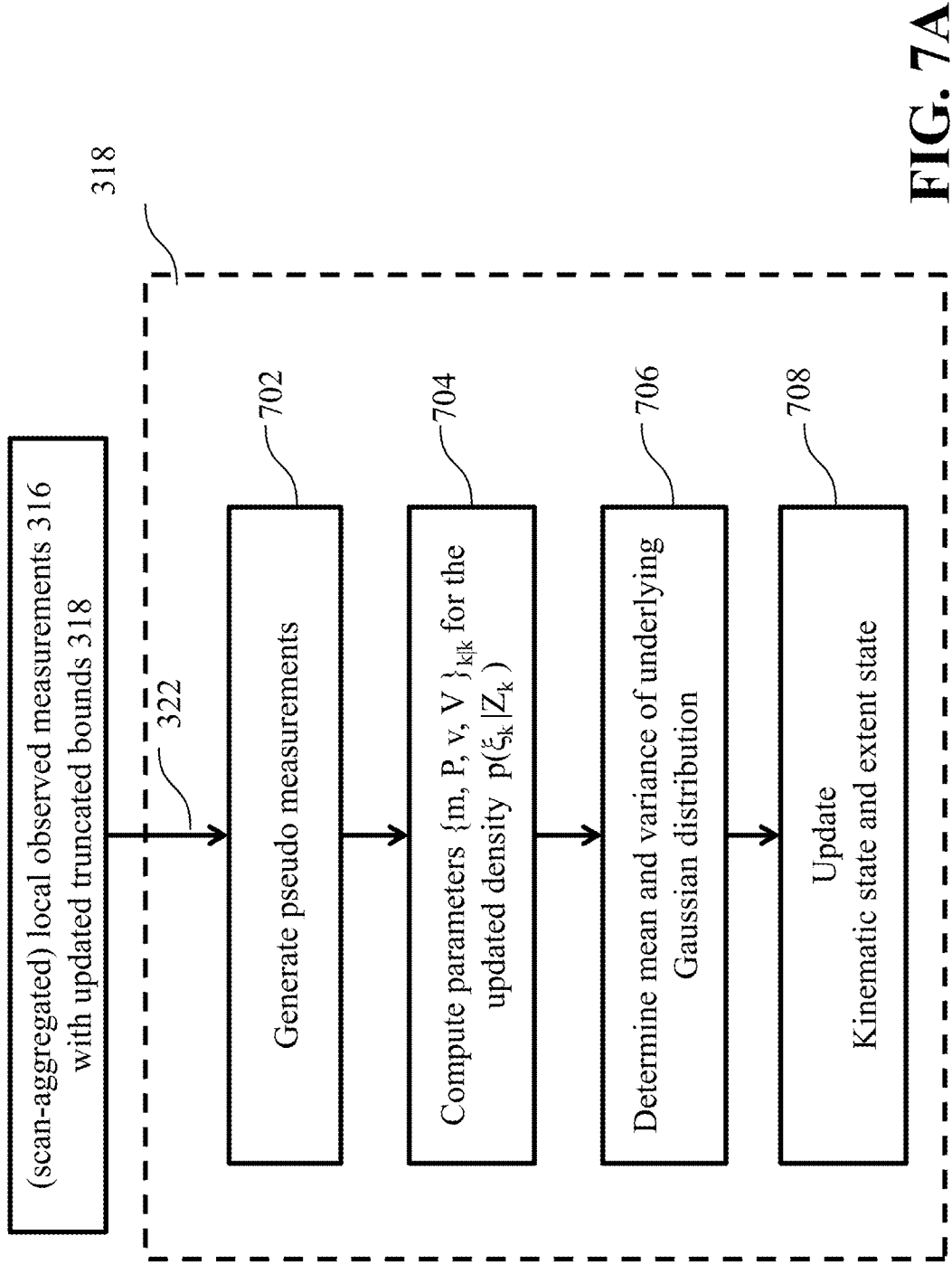
FIG. 7A shows a schematic of expanded state update step, according to some embodiments.

FIG. 7A shows a schematic of the expanded state update step 318, according to some embodiments. The local observed measurements 322 are obtained after the optional scan-aggregation 316 and truncation bound update 318. Based on surface volume distribution of automotive radar measurements, two sufficient statistics, i.e., sample mean and sample spread (variance) can be computed using the regular random matrix approach. However, the computation of the sample mean and variance using the regular random matrix approach may yield biased estimates for both the kinematic and extended state of the object.

Figure 7B:
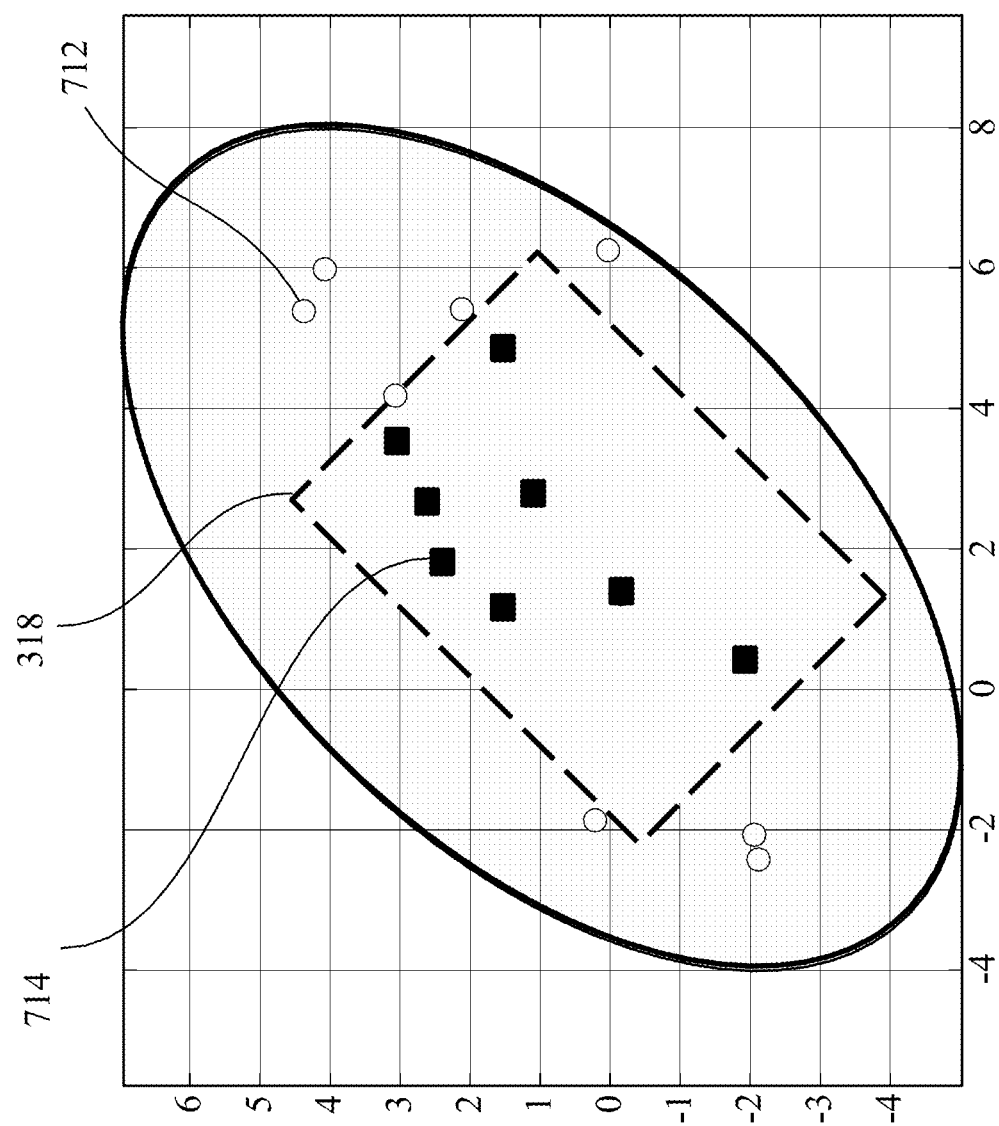
FIG. 7B shows exemplary pseudo measurements, according to some embodiments.

To correct such biases, pseudo measurements are formulated. Further, in some embodiments, the pseudo measurements are utilized to compute the sample mean and variance. In some embodiments, the pseudo measurements are generated 702 by utilizing the hierarchical measurement model, by the processor 204. The pseudo measurements are utilized to compute the sample mean and variance. FIG. 7B shows exemplary pseudo measurements 714, according to some embodiments. The dash square represents the updated truncation bounds according to the step 318. The circles 712 represents the (possibly aggregated) local observed measurements in the object coordinate and dark dots 714 represent the pseudo measurements. The ratio between the numbers of observed measurements 712 and pseudo measurements 714 is determined by the normalization factor of the truncated Gaussian distribution. The $n_k$ observed measurements $z_k^j$ correspond to the measurement-source variables $y_k^j$, that are distributed according to $\mathcal{TN}$ $(y_k^j; Hx_k, \rho X_k, D_k)$.

It is assumed $n_c$ pseudo measurements $\tilde{z}_k = \tilde{z}_k^j$ are drawn from complementary measurement likelihood $$p(\tilde{z}_k|\xi_k) = \frac{\int_{D_k^c} \mathcal{N}(\tilde{z}_k^j; \tilde{y}_k^j, R_k) \mathcal{N}(\tilde{y}_k^j; H_{x_k}, \rho X_k) d\tilde{y}_k^j}{1 - c_{D_k}} \quad (8)$$

with corresponding pseudo measurement-source variables $\tilde{y}_k^j | \xi_k \sim \mathcal{TN}$ $(\tilde{y}_k^j; Hx_k, \rho X_k, D_k^c)$ where $D_k \cup D_c = \mathbb{R}^2$. If number of pseudo samples meets the ratio of $n_k/n_k^c = c_{D_k}/(1 - c_{D_k})$, then joint measurement-source variables $$\check{Y}_k = \left\{ y_k^1, \ldots, y_k^{n_k}, \tilde{y}_k^1, \ldots, \tilde{y}_k^{n_k^c} \right\} \quad (9)$$

can be regarded as equivalent samples from the underlying Gaussian distribution $\mathcal{N}$ $(\check{y}_k^j; Hx_k, \rho X_k)$. Consequently, corresponding joint measurements $_k = \{z_k^1, \ldots, z_k^{n_k}, \tilde{z}_k^1, \ldots, \tilde{z}_k^{n_k^c}\}$ are equivalent samples from the distribution $\mathcal{N}$ $(\check{z}_k^j; Hx_k, \rho X_k + R_k)$. As a result of the underlying Gaussian distribution, the kinematic state $x_k$ and the extended state $X_k$ can be captured by first-order and second-order sufficient statistics given by the sample mean and variance of $_k$ 706. where $$m_{\check{z}_k} = \sum_{j=1}^{n_k + n_k^c} \check{z}_k^j / (n_k + n_k^c) = c_{D_k} \bar{z}_k + (1 - c_{D_k}) \bar{\tilde{z}}_k, \quad (10)$$

$$\sum_{\check{z}_k} = \sum_{j=1}^{n_k + n_k^c} (\check{z}^j - m_{\check{z}_k})(\check{z}^j - m_{\check{z}_k})^T \text{ where } \bar{z}_k = \quad (11)$$

$$\sum_{j=1}^{n_k} z_k^j / n_k \text{ and } \bar{\tilde{z}}_k = \sum_{j=1}^{n_k^c} \tilde{z}_k^j / n_k^c.$$

To that end, some embodiments are based on objective of computing the above sample mean and variance. To compute the above sample mean and variance 706, the pseudo measurements $\tilde{y}_k^j$ are generated, by the processor 204, as samples from $\mathcal{TN}$ $(\tilde{y}_k^j; Hx_{k|k}, \rho X_{k|k}, D_k^c)$ and then $\tilde{z}_k^j = \tilde{y}_k^j + v_k$ where the object state $\{x_{k|k}, X_{k|k}\}$ and the truncation bounds $D_k^c$ are from previous iteration step. In some embodiments, to avoid the synthetic sampling of $\tilde{z}_k^j$ and $\tilde{y}_k^j$, the sample mean of $\tilde{z}_k^j$ and $\Sigma \tilde{z}_k^j \{\tilde{z}_k^j\}^T$ may be replaced by its expectation $\mathbb{E}\{\tilde{z}_k^j\}$ and its second-order moment $\mathbb{E}\{\tilde{z}_k^j \{\tilde{z}_k^j\}^T\}$. With the two sufficient statistics, the associated parameters $\{m, P, v, V\}_{k|k}$ for the updated density $p(\xi_k|Z_k)$ are computed 704, by the processor 204. The associated parameters $\{m, P, v, V\}_{k|k}$ for the updated density $p(\xi_k|Z_k)$ are given as $$m_{k|k} = m_{k|k-1} + K\varepsilon, \quad (12a)$$

$$P_{k|k} = P_{k|k-1} - KHP_{k|k-1}, \quad (12b)$$

$$v_{k|k} = v_{k|k-1} + n_k, \quad (12c)$$

$$V_{k|k} = V_{k|k-1} + \hat{N} + \hat{Z}, \quad (12d)$$

where $K = P_{k|k-1} H^T S^{-1}$, $S = H P_{k|k-1} H^T + \hat{R}/n_k$, $\hat{R} = \rho \hat{X} + R_k$, $\hat{X} = V_{k|k-1}/(v_{k|k-1} - 6)$, and $\varepsilon = m_k - Hm_{k|k-1}$. Similar to the prediction step, the update step for the kinematic state $x_k$ 708 is a Kalman-filter-like update in (12a) and (12b). Further, the extended state update 708 in (12c) and (12d) requires two matrices $$\hat{N} = \hat{X}^{1/2} \hat{S}^{-1/2} \varepsilon \varepsilon^T \hat{S}^{-1/2} \hat{X}^{1/2}, \quad (13a)$$

$$\hat{Z} = \hat{X}^{1/2} \hat{R}^{-1/2} \Sigma_k \hat{R}^{-1/2} \hat{X}^{1/2}, \quad (13b)$$

which are proportional to the spreads of the predicted measurement $H\, m_{k|k-1}$ (via $\varepsilon$) and the joint measurements $_k$ (via $\Sigma_k$) with respect to the centroid $m_{_k}$ of the joint measurements, respectively.

Figure 7C:
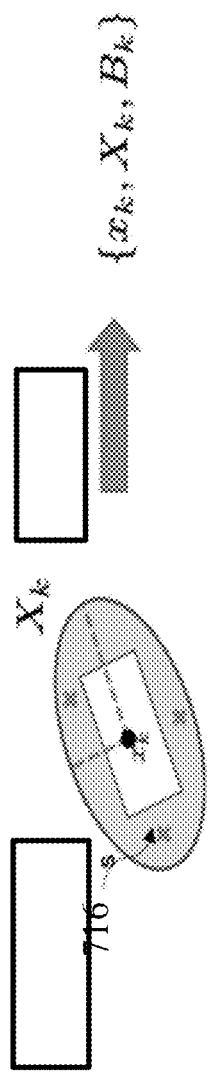
FIG. 7C shows a schematic of pseudo measurements generation, truncation bound update, and expanded state update, according to some embodiments.
Figure 7C:
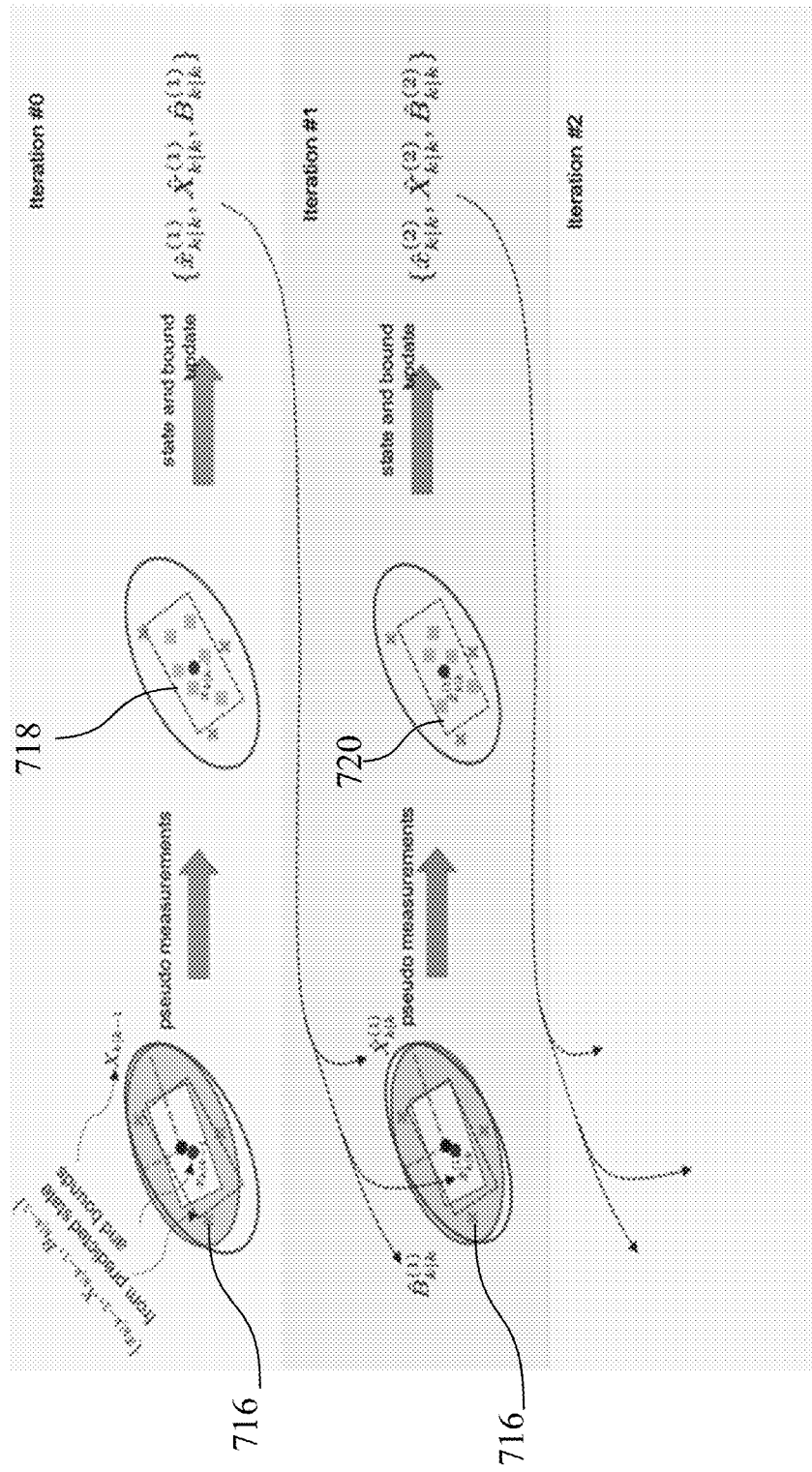

FIG. 7C shows a schematic of pseudo measurements generation, truncation bound $B_k$ update and the expanded state update, according to some embodiments. Initial kinematic state $x_k$, extended state $X_k$ and truncation bounds $B_k$ are obtained. Given observed measurements 716, and predicted kinematic state $x_{k|k-1}$, extended state $X_{k|k-1}$ and truncation bounds $B_{k|k-1}$, pseudo measurements 718 are generated, by the processor 204, in iteration-0. Further, in the iteration-0, the pseudo measurements 718 are utilized to estimate the kinematic state, the expanded state, and the truncation bound which are denoted as $\hat{x}_{k|k}^{(1)}$, $\hat{X}_{k|k}^{(1)}$ and $\hat{B}_{k|k}^{(1)}$, respectively. To that end, iteration-0 yields $\hat{x}_{k|k}^{(1)}$, $\hat{X}_{k|k}^{(1)}$ and $\hat{B}_{k|k}^{(1)}$.

In next iteration i.e. iteration-1, based on the previous iteration estimates $\hat{x}_{k|k}^{(1)}$, $\hat{X}_{k|k}^{(1)}$ and $\hat{B}_{k|k}^{(1)}$, and the observed measurements 716, pseudo measurements 720 are generated, by the processor 204. Further, the pseudo measurements 720 are utilized to estimate the kinematic state, the expanded state, and the truncation bound which are denoted as $\hat{x}_{k|k}^{(2)}$, $\hat{X}_{k|k}^{(2)}$ and $\hat{B}_{k|k}^{(2)}$, respectively, by the processor 204. Thereby, updating the states and the truncation bounds estimated in the iteration-0. Likewise, in iteration-2, pseudo measurements are generated and $\hat{x}_{k|k}^{(2)}$, $\hat{X}_{k|k}^{(2)}$ and $\hat{B}_{k|k}^{(2)}$ are updated to $\hat{x}_{k|k}^{(3)}$, $\hat{X}_{k|k}^{(3)}$ and $\hat{B}_{k|k}^{(3)}$ (not shown in figure), by the processor 204. The iterations are executed, by the processor 204, until a termination condition is met. The termination condition may be predefined. In some embodiments, the termination condition is met when a number of iterations is greater than a threshold value.

Truncation Bound Update

Figure 8A:
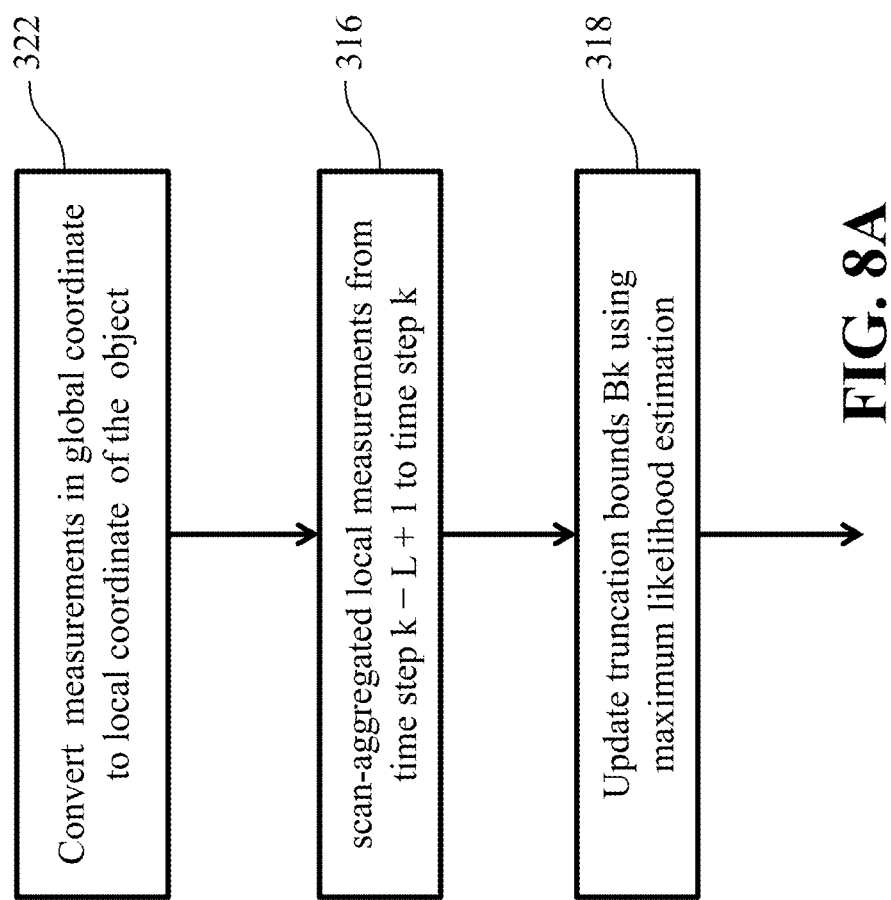
FIG. 8A shows a schematic of truncation bound update step, according to some embodiments.

FIG. 8A shows a schematic of the coordinate transform 322 from the ego-vehicle coordinate to the object coordinate, scan aggregation 316, and online truncation bound update step 318, according to some embodiments. Given the above updated state $\xi_{k|k} = [x_{k|k}, X_{k|k}]$, the truncation bounds $B_k$ are updated by maximizing the measurement likelihood $p(Z_k|\xi_{k|k}; B_k) = \Pi_j p(z_k^j | \xi_{k|k}; B_k)$ where the individual measurement likelihood $p(z_k^j | \xi_{k|k}; B_k)$ is given by the likelihood (4) as described in description of FIG. 4. The measurement likelihood is defined as a function of the four bounds 404, for example, $a_1, b_1, a_2,$ and $b_2$ in $B_k$ via the cumulative density function (CDF) of a standard Gaussian distribution. In particular, at t-th iteration, measurements at time step k in global coordinate are converted into local measurements in object coordinate (OC) system using the updated state estimate from (t−1)-th iteration, by the processor 204. The truncation bounds $B_k$ defines the density support $D_k$. With scan-aggregated local measurements 316 from time step $k−L+1$ to the time step k, the truncation bounds specified by $B_k$ are updated, by the processor 204, using maximum likelihood (ML) estimation 318. To that end, the truncation bounds are updated and, consequently, the updated truncation bounds are obtained.

Further, in some embodiments, with the updated truncation bounds and the measurements at time step k, the kinematic and extent states are updated, by the processor 204, using the HTG-RM. Some embodiments are based on a realization that accurate estimates of the truncation bounds by using filtered scan-aggregated measurements from past time scans to update the truncation bounds.

Figure 8B:
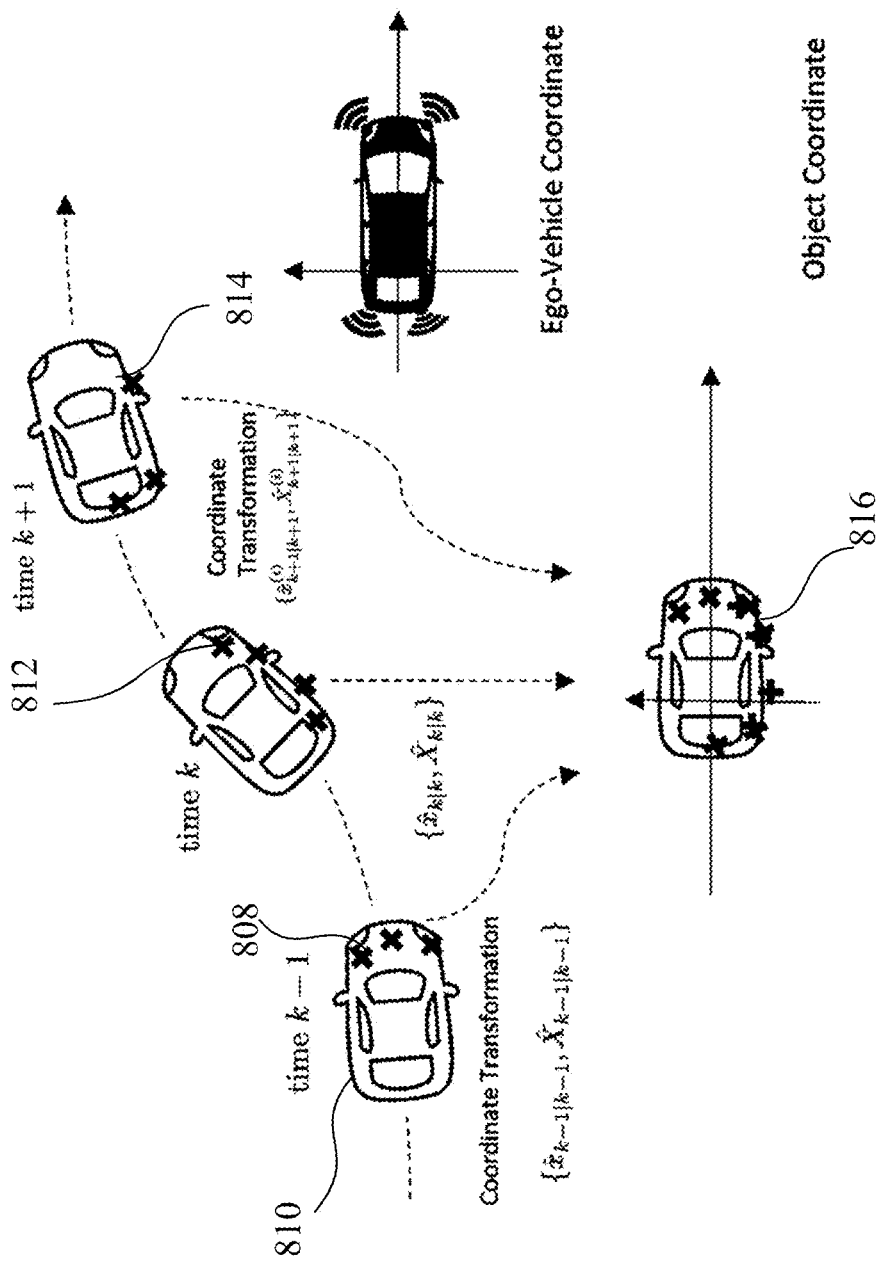
FIG. 8B illustrates a filtered scan aggregation in an object coordinate system, according to some embodiments.

FIG. 8B illustrates a filtered scan aggregation 316 in the object coordinate system, according to some embodiments. The filtered scan aggregation is beneficial when the automotive radar measurements are sparse and partial-viewed due to self-occlusion. Measurements 808 of an object 810 at time step k-tin the global coordinate system are obtained. Likewise, measurements 812, 814 are obtained at time stamp k and k+1, respectively, in the global coordinate system. Further, some embodiments are based on a realization that given the measurements (denoted by z) in the global coordinate system (GC) and a mean m of the object kinematic state, corresponding measurement in the OC 816 at t-th iteration can be obtained as $$z_{OC}^{(t)} = M_m^{(t-1)-1}(z - Hm^{(t-1)}), \qquad (14)$$

where M is a rotation matrix that can be constructed using the object kinematic mean $m^{(t-1)}$. Further, $Z_{OC}^{(t)}$ groups all local measurements at the t-th iteration. At the last T-th iteration, the corresponding local measurements are retained for the scan aggregation. In particular, $$z_{OC,k}^j = z_{OC}^{(T+1)} = M_m^{(t-1)-1}(z_k^j - Hm^{(T-1)}), \qquad (15)$$

and $Z_{OC}^k = \{Z_{OC,k}^j\}_{j=1}^{n_k}$ denotes the filtered scan-aggregated measurements from the time step k. With a sliding window size L, the filtered scan-aggregated measurement set is denoted as $Z_{OC}^{k-L+1:k} = \{Z_{OC}^{k-L+1}, \ldots, Z_{OC}^k\}$ The filtered scan-aggregated measurements $Z_{OC}^{k-L+1:k}$ and the new local measurements $Z_{OC}^{(t)}$ are grouped into $Z_{OC}^{(t),k-L+1:k}$. The ML estimates $\hat{B}_k^{(t)}$ of the truncation bounds at the t-th iteration are given by $$\operatorname*{argmin}_{B_k^{(t)}} \sum_{z \in Z_{OC}^{(t),k-L+1:k}} -\log p(z_k^j | \xi_k^{(t-1)}, B_k^{(t)}) \qquad (16)$$

where $p(z|\xi_k^{(t-1)}, B_k^{(t)})$ is of the form of (4) that involves both the normalization factor $C_{D_k}$ and truncated area $D_k$ as a function of $B_k^{(t)}$. The ML estimation of the four truncation bounds needs to compute a integration over D and directly solving (16) can be computationally demanding for online update. To that end, the scan-aggregated measurements are divided into four clusters, by the processor 204, using a expectation-maximization algorithm, which effectively decomposes joint ML bound update into up to four decoupled ML estimates of the truncation bound. The updates of the other three truncation bounds can be implemented similarly, by the processor 204. In what follows, omission of the notation of iteration index t for brevity. It is noted that the truncation bound can be set to +∞ when its corresponding measurement set is empty. Let $f(y_1) = \mathcal{TN}(0, \Lambda_{1,1}, b_{k,1})$ and $f(r_1) = (0, R_{1,1})$ denote, respectively, a probability density function (PDF) of a uni-variate truncated Gaussian distribution with density support $\{y|y > b_{k,1}\}$ and that of the Gaussian distribution with zero mean and variance $R_{1,1}$. Using a convolution formula, density of $z_1 = y_1 + r_1$ is given by $$f(z_1) = \frac{\Phi\left(\sqrt{\Lambda_{1,1} R_{1,1}^{-1} \zeta_{1,1}^{-1}} z_1 - \sqrt{\zeta_{1,1} \Lambda_{1,1}^{-1} R_{1,1}^{-1}} b_{k,1}\right)}{e^{0.5 z_1^2 \zeta_{1,1}^{-1}} \sqrt{2\pi \zeta_{1,1}} \Phi(-b_{k,1} \Lambda_{1,1}^{-1/2})} \qquad (17)$$

where $\Phi(\bullet)$ denotes the cumulative density function (CDF) of the standard.

Gaussian distribution, $\Lambda = \rho M_{m_{k|k}}^{-1} V_{k|k} (M_{m_{k|k}}^{-1})^T/(v_{k|k}-6)$ is a transformed object extent matrix in the OC, and $\zeta_{1,1} = \Lambda_{1,1} + R_{1,1}$. Then, decomposed ML estimation is to maximize the likelihood of measurement set $Z_{b_{k,1}}$ as $$\operatorname*{argmax}_{b_{k,1}: b_{k,1} > 0} \prod_{z \in Z_{b_{k,1}}} f(z_1) \qquad (18)$$

where $z_1$ is given by x-coordinate of z. This is equivalent to minimizing the following cost function $$\operatorname*{argmax}_{b_{k,1} > 0} \qquad (19)$$

$$\sum_{z \in Z_{b_{k,1}}} \left( \log \Phi(-b_{k,1} \Lambda_{1,1}^{-0.5}) - \log \Phi\left(\sqrt{\Lambda_{1,1} R_{1,1}^{-1} \zeta_{1,1}^{-1}} z_1 - \sqrt{\zeta_{1,1} \Lambda_{1,1}^{-1} R_{1,1}^{-1}} b_{k,1}\right) \right)$$

which can be efficiently solved with standard root-finding algorithms (for example, Halley's method).

Figure 9A:
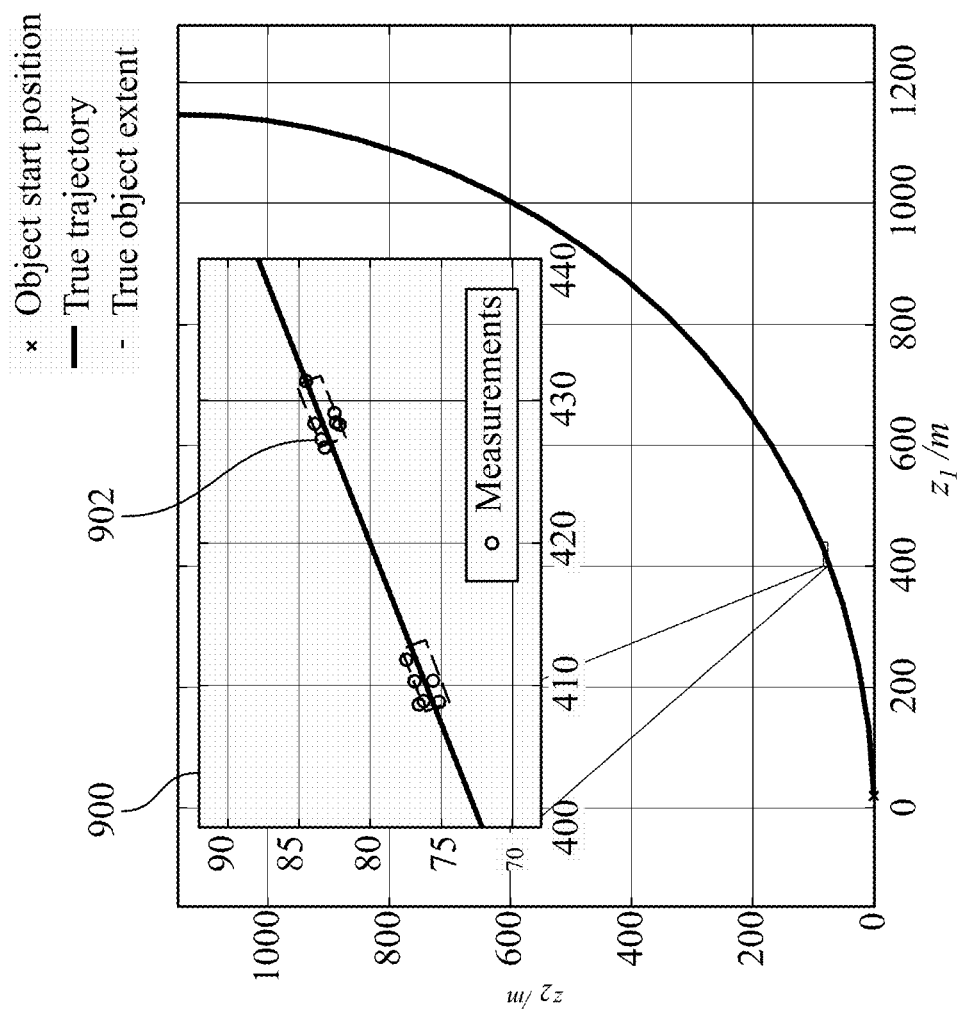
FIG. 9A shows simulation of a scenario that an object moves over a course of turn for 90 time steps, according to some embodiments.

FIG. 9A shows simulation of a scenario that an object moves over a course of turn for 90 time steps, according to some embodiments. Center of object rotation coincides with object's physical center. In some embodiments, the object is a rectangular shape object, for example, 4.7-m long and 1.8-m wide. The kinematic state of the object is defined as $x_k = [p_k, v_k, \theta_k, \omega_k]^T \in \mathbb{R}^5$ with two-dimensional position $p_k \in \mathbb{R}^2$, polar velocity $v_k$, heading/orientation $\theta_k$ and turn rate $\omega_k$. The extended state of the object is defined by a symmetric and positive definite covariance matrix $X_k$ of the position $p_k$. Since objects are rigid-body, its width (w) and length (l) are estimated using an eigenvalue decomposition of the estimated extended state:

$$X_k = M(\theta_k) \operatorname{diag}([l^2/4, w^2/4]) M^T(\theta_k),$$

where $M(\theta_k)$ is a unitary matrix as a function of the object orientation ($\theta_k$).

In some embodiments, a nearly constant turn rate and polar velocity motion model is used with sampling time $T_s = 1$ s and standard polar and angular acceleration noise $\sigma_v = 0.1$ and $\sigma_\omega = \pi/180$, respectively. Transformation function $E(\bullet)$ is a rotation matrix that depends on the turn rate, i.e., $E(x_k) = M(\omega_k)$. Further, a course of simulated trajectory is obtained.

Figure 9B:
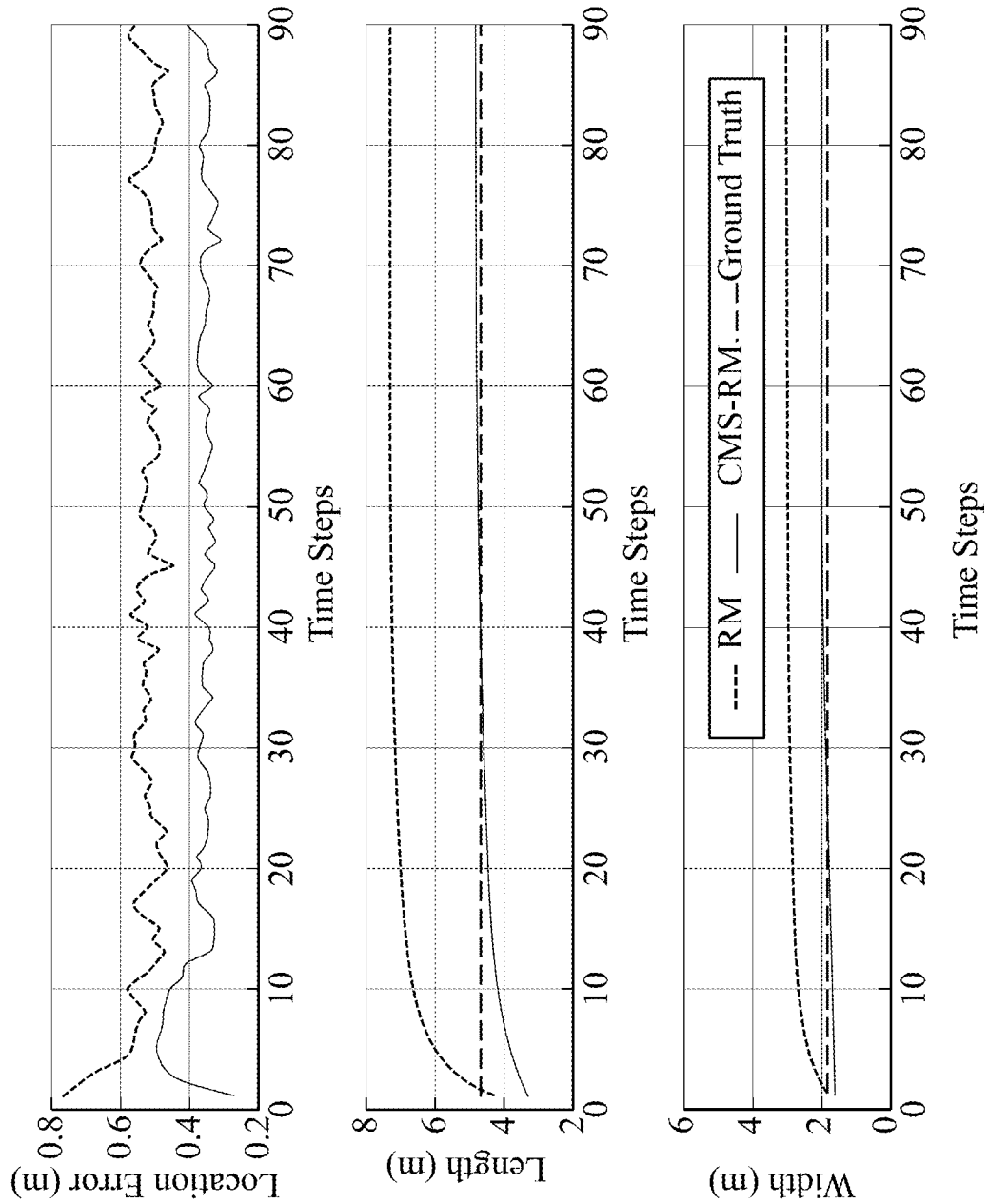
FIG. 9B shows a performance evaluation graph with ideal measurement model, according to some embodiments.

FIG. 9B shows a performance evaluation graph with ideal measurement model, according to some embodiments. Consider an ideal case that the automotive radar measurements follow the hierarchical truncated Gaussian model over the course of simulated trajectory. Further, in some embodiments, the number of measurements at each time step is drawn from a Poisson distribution with a mean of 8. FIG. 9A shows two snapshots 900 of synthesized automotive radar measurements around the object, a good indicator of realistic radar measurements. It is seen that most of these radar measurements appear to be around the object edges 902. From 100 Monte-Carlo runs, the object tracking performance between a regular random matrix (denoted as RM) and the hierarchical truncated Gaussian random matrix (referred to as HTG-RM) algorithm are compared. FIG. 9B shows object tracking performance in terms of localization errors (positions), object length and width errors overall 90 time steps with ideal measurement model. It is evident from FIG. 9B that the HTG-RM algorithm outperforms the regular random matrix approach in several aspects. Particularly, the HTG-RM algorithm provides more consistent estimates in terms of the object length and width over time. Further, corresponding root mean squared errors (RMSEs) of the kinematic and extended states estimate of the object are analyzed.

FIG. 9C is a tabular column showing the RMSEs of the kinematic and extended states estimate of the object corresponding to the RM and the HTG-RM, with the ideal measurement model. The root mean squared error of the kinematic and extended states estimate of the object under the HTG-RM are significantly less compared to the kinematic and extended states estimate of the object under the RM. Specifically, the HTG-RM yields significantly less RMSE in the object length l and width w estimate compared to the RM.

Figure 10A:
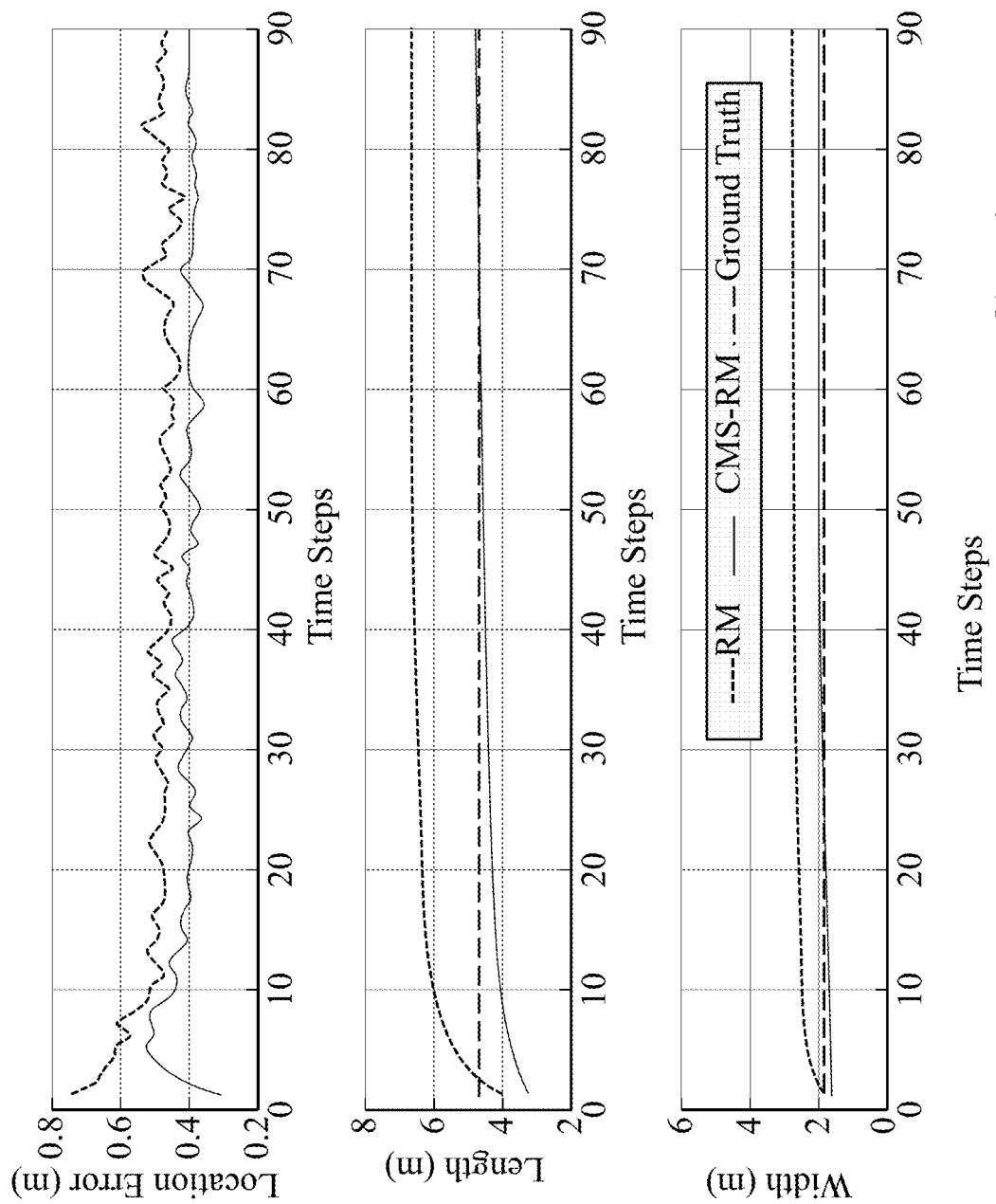
FIG. 10A shows a performance evaluation graph with under model mismatch, according to some embodiments.

FIG. 10A shows performance evaluation with under model mismatch, according to some embodiments. In real-time no measurement model may perfectly describe the real-world automotive radar measurements. To that end, some embodiments are based on a recognition that to evaluate the robustness of the HTG-RM algorithm under model mismatch, a variational radar model of 50 Gaussian mixture components learned from aggregated real-world automotive radar measurements is adopted to generate radar measurements over the course in FIG. 9A. FIG. 10A shows the object tracking performance in terms of the localization errors (positions), the object length and width errors overall 90 time steps under model mismatch.

It is evident from FIG. 10A that the HTG-RM algorithm still outperforms the regular RM approach. Compared with the case of the ideal measurement model in FIG. 9B, the HTG-RM performance is slightly degraded which shows the robustness of the HTG-RM algorithm over a different surface volume measurement model. This is further confirmed by comparing the RMSEs of the kinematic and extended state estimates of the RM with the RMSEs of the kinematic and extended state estimates of the HTG-RM.

FIG. 10B is a table showing the RMSEs of the kinematic and extended states estimate of the object corresponding to the RM and the HTG-RM, under the model mismatch. The RMSE of the kinematic and extended states estimate of the object under the HTG-RM are significantly less compared to the kinematic and extended states estimate of the object under the RM. It is evident from the tabular column that, in particular, the RMSE of the object length and the width estimate under the HTG-RM are significantly less compared to the object length and the width estimate under the RM.

Figure 11A:
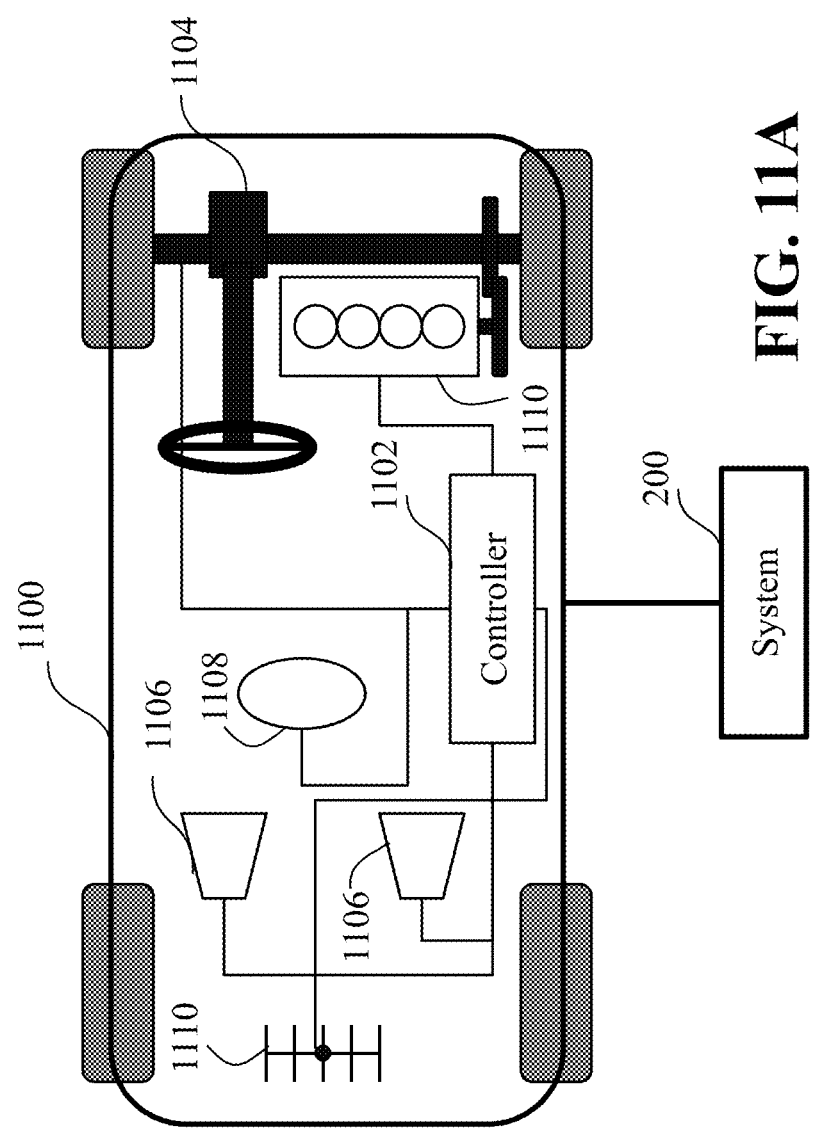
FIG. 11A shows a schematic of a vehicle including a controller in communication with the system employing principles of some embodiments.

FIG. 11A shows a schematic of a vehicle 1100 including a controller 1102 in communication with the system 200 employing principles of some embodiments. The vehicle 1100 may be any type of wheeled vehicle, such as a passenger car, bus, or rover. Also, the vehicle 1100 can be an autonomous or semi-autonomous vehicle. For example, some embodiments control the motion of the vehicle 1100. Examples of the motion include lateral motion of the vehicle controlled by a steering system 1104 of the vehicle 1100. In one embodiment, the steering system 1104 is controlled by the controller 1102. Additionally or alternatively, the steering system 1104 may be controlled by a driver of the vehicle 1100.

In some embodiments, the vehicle may include an engine 1110, which can be controlled by the controller 1102 or by other components of the vehicle 1100. In some embodiments, the vehicle may include an electric motor in place of the engine 1110 and can be controlled by the controller 1102 or by other components of the vehicle 1100. The vehicle can also include one or more sensors 1106 to sense the surrounding environment. Examples of the sensors 1106 include distance range finders, such as radars. In some embodiments, the vehicle 1100 includes one or more sensors 1108 to sense its current motion parameters and internal status. Examples of the one or more sensors 1108 include global positioning system (GPS), accelerometers, inertial measurement units, gyroscopes, shaft rotational sensors, torque sensors, deflection sensors, pressure sensor, and flow sensors. The sensors provide information to the controller 1102. The vehicle may be equipped with a transceiver 1110 enabling communication capabilities of the controller 1102 through wired or wireless communication channels with the system 200 of some embodiments. For example, through the transceiver 1110, the controller 1102 receives the control inputs from the system 200.

Figure 11B:
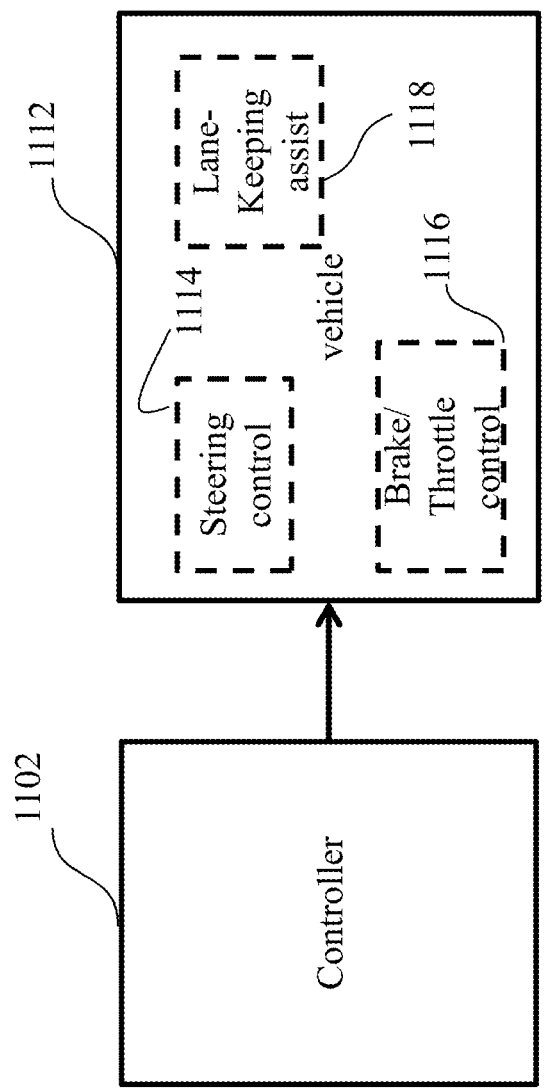
FIG. 11B shows a schematic of interaction between the controller and controllers of the vehicle, according to some embodiments.

FIG. 11B shows a schematic of interaction between the controller 1102 and controllers 1112 of the vehicle 1100, according to some embodiments. For example, in some embodiments, the controllers 1112 of the vehicle 1100 are steering control 1114 and brake/throttle controllers 1116 that control rotation and acceleration of the vehicle 1100. In such a case, the controller 1102 outputs control commands, based on the control inputs, to the controllers 1114 and 1116 to control the kinematic state of the vehicle. In some embodiments, the controllers 1112 also includes high-level controllers, e.g. a lane-keeping assist controller 1118 that further process the control commands of the controller 1102. In both cases, the controllers 1112 utilize the output of the controller 1102 i.e. control commands to control at least one actuator of the vehicle, such as the steering wheel and/or the brakes of the vehicle, in order to control the motion of the vehicle.

FIG. 11C shows a schematic of an autonomous or semi-autonomous controlled vehicle 1120 for which the control inputs are generated by using some embodiments. The controlled vehicle 1120 may be equipped with the system 200. In some embodiments, each of the obstacles 1122 are tracked by the controlled vehicle 1120 and subsequently, the control inputs are generated based on the obstacles tracking. In some embodiments, the control inputs include commands specifying values of one or combination of a steering angle of the wheels of the vehicle and a rotational velocity of the wheels, and the measurements include values of one or combination of a rotation rate of the vehicle and an acceleration of the vehicle.

The generated control inputs aim to keep the controlled vehicle 1120 within particular bounds of road 1124, and aims to avoid other uncontrolled vehicles, i.e., obstacles 1122 for the controlled vehicle 1120. For example, based on the control inputs, the autonomous or semi-autonomous controlled vehicle 1120 may, for example, pass another vehicle on the left or on the right side or instead to stay behind another vehicle within the current lane of the road 1124.

Estimating Geometric Parameters of Measurement Model with Offline Training Datasets Using Machine Learning Some embodiments are based on understanding that the complexity of spatial characteristics of real-world automotive radar measurements. This complexity is partly mitigated by introduction of hierarchical truncated Gaussian (HTG) measurement model that uses truncated Gaussian distribution to represent the complexity of the measurements. Indeed, the HTG measurement model can adequately approximate the spatial distribution of real-world automotive radar measurements on vehicles. It can also be integrated into the RM-based approach with a modified state update step and online truncation bound estimation in for full-view measurements and/or for partial-view measurements due to object self-occlusion. However, some embodiments are based on another recognition that it is possible to offload the bound estimation in the state update step by leveraging large-scale offline training datasets in order to learn truncation bounds and other parameters associated with the HTG measurement model from the training data.

Figure 12:
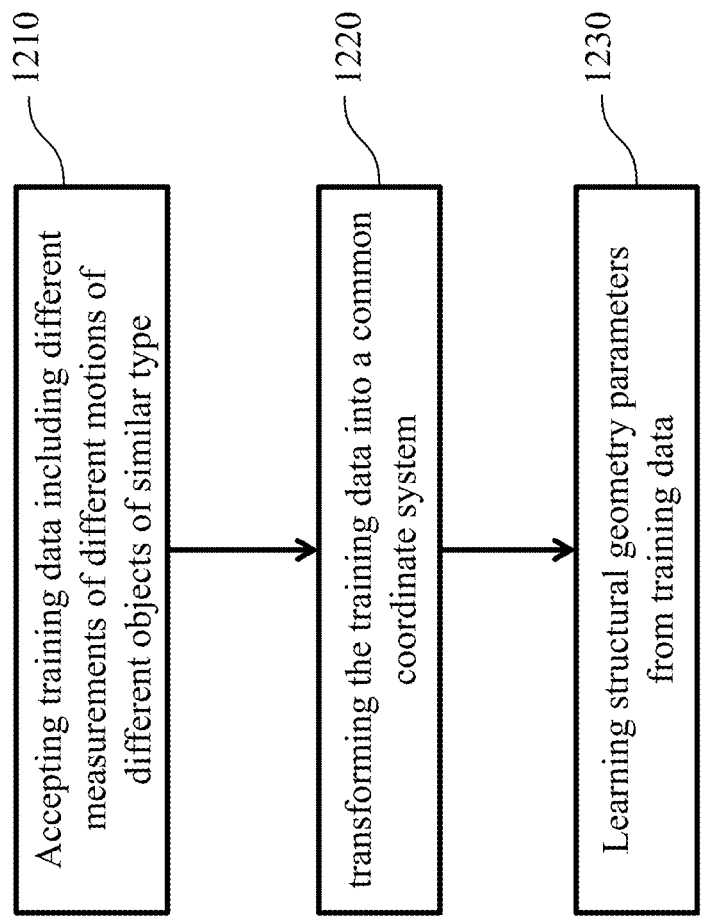
FIG. 12 shows a flow chart of a method for learning the geometry-related structural model parameters according to some embodiments.

FIG. 12 shows a flow chart of a method for learning the geometry-related structural model parameters according to some embodiments. Examples of structural geometry parameters include one or combination of truncation bounds, their orientations and a scaling factor of the HTG measurement model. In some implementations, the state-related parameters such as the kinematic mean and extent covariance matrix in the measurement likelihood are not part of the learned parameters.

In these embodiments, the measurement model includes a hierarchical truncated Gaussian model with structural geometry parameters learned from training data. The training data 1210 include different measurements of different motions of different objects. To address inconsistency of the training data, the structural geometry parameters are learned 1230 using machine learning by transforming 1220 the training data 1210 into a common coordinate system. In such a manner, the embodiments overcome lack of training data problem of the machine learning.

Figure 13A:
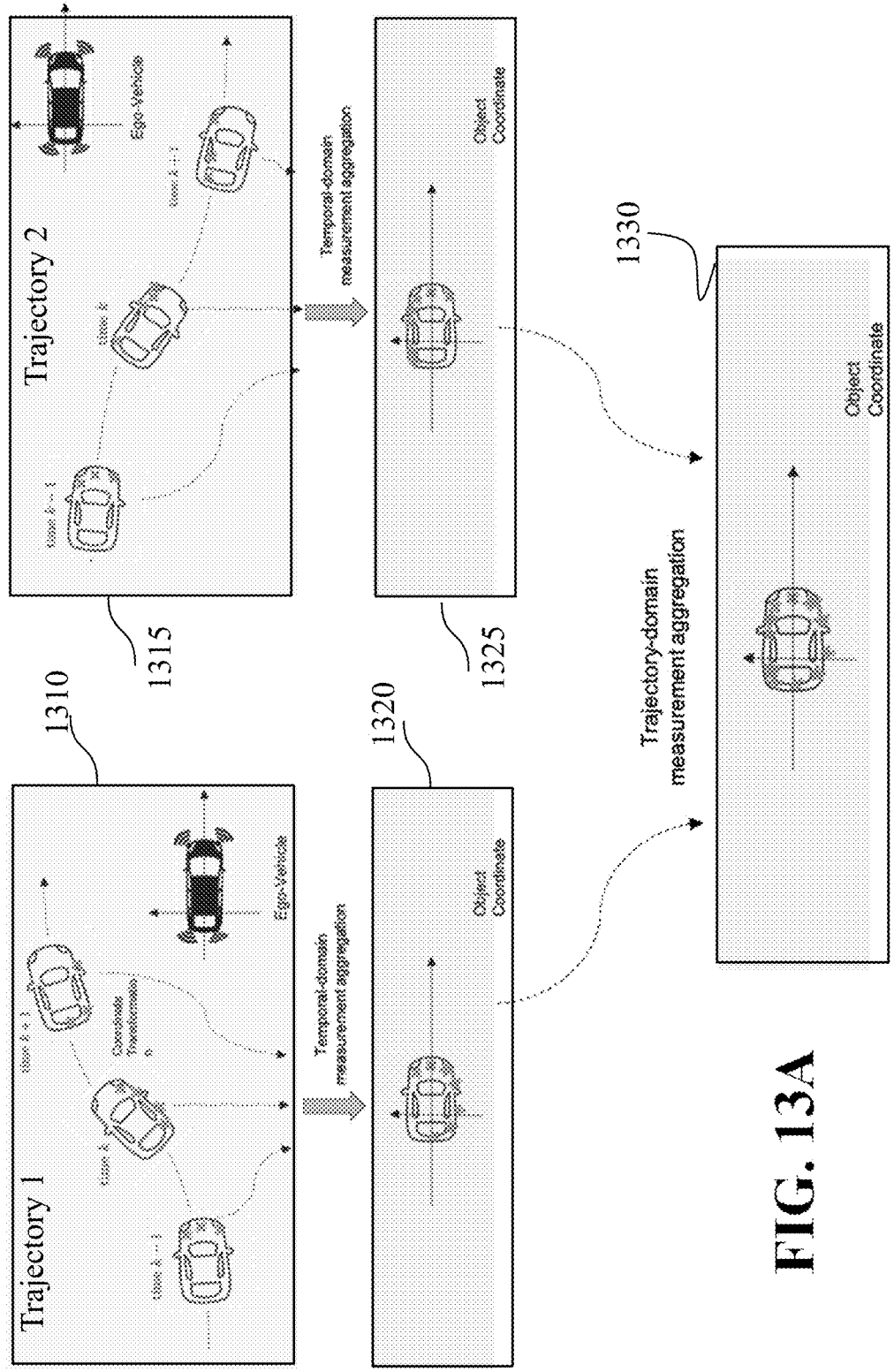
FIGS. 13A, 13B and 13C show schematics of transformation of training data collected from different motions of different objects into a common unit coordinate system according to some embodiments.
Figure 13B:
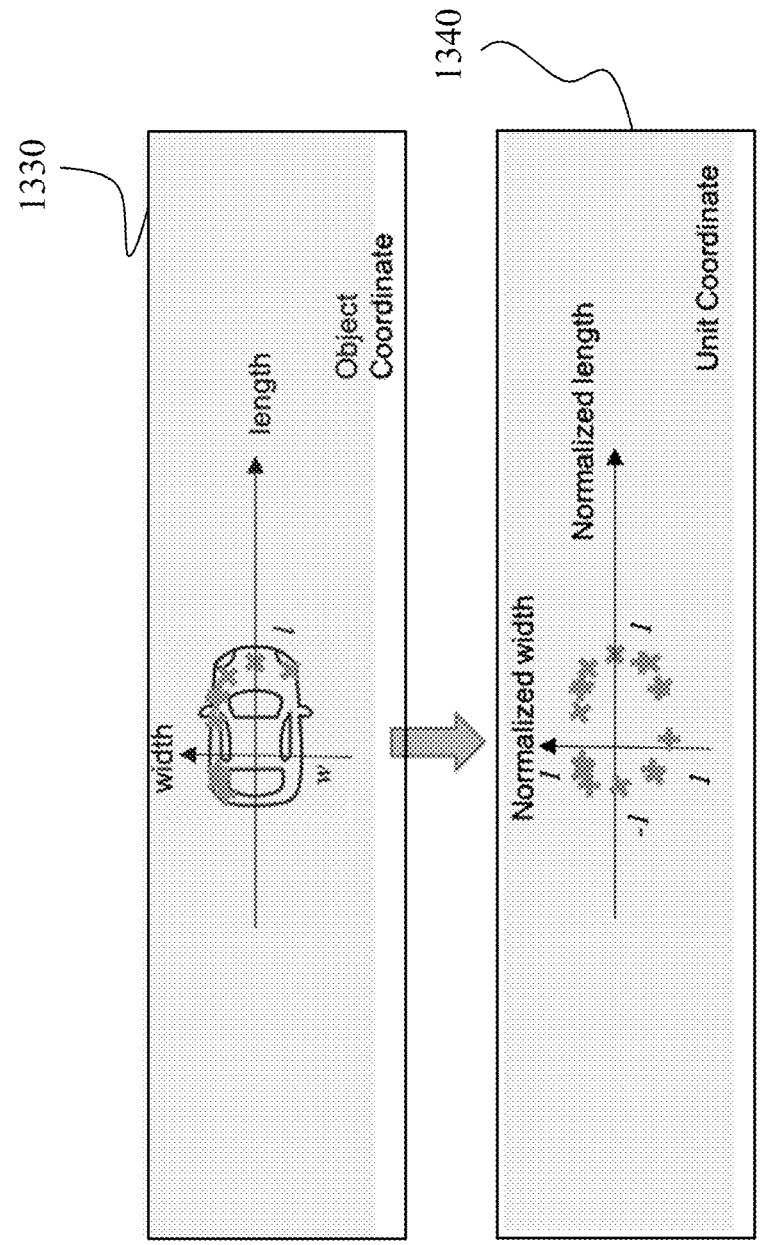
Figure 13C:
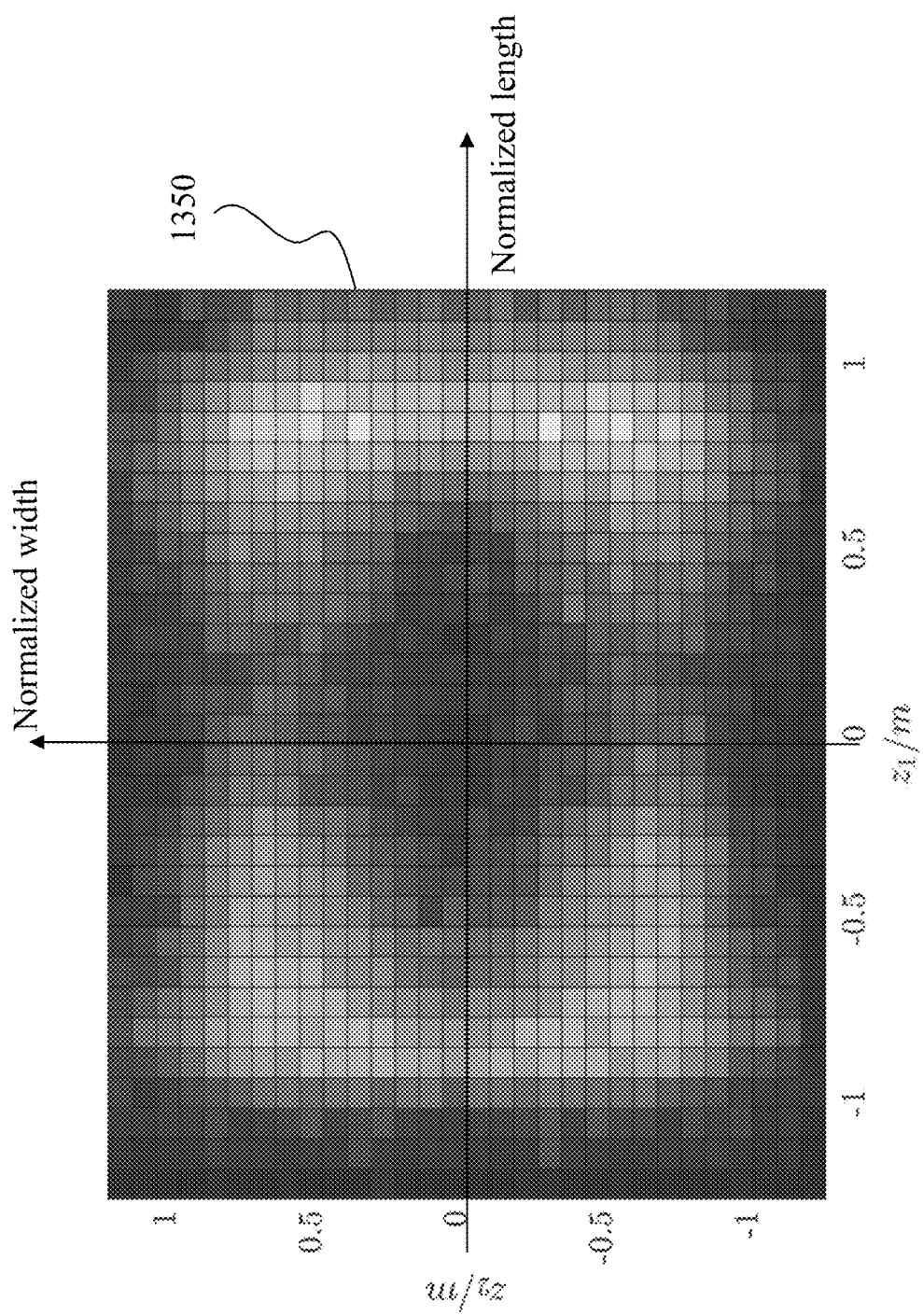

FIGS. 13A, 13B and 13C show schematics of transformation of training data collected from different motions of different objects into a common unit coordinate system according to some embodiments. The measurements collected from tracking different trajectories 1310 and 1315 are converted into object-centered (OC) coordinate system 1320 and 1325. Then, the converted measurements are aggregated 1330. In some implementations, the measurements are collected for motion of similar type of objects, e.g., from motions of similar class of vehicles. For example, the embodiments, for each trajectory, convert the measurements from each time step from the global coordinate (GC) to the object-centered (OC) coordinate and aggregate OC measurements from all trajectories for vehicles with a similar size (e.g., sedan).

Next, as shown in FIG. 13B, the embodiments convert the aggregated OC 1330 measurements to a unit coordinate (UC) system 1340. In some implementations, the conversion UC system is performed by various normalization techniques allowing to use the converted training data for machine learning. FIG. 13C shows an example 1350 of aggregated measurements from real-world datasets (nuScenes) in the UC system used by some embodiments.

As describe above, some embodiments focus on estimation of the EOT in probabilistic manner. The object state as a tuple $\xi_k=(x_k,X_k)$ with $x_k$ denoting the kinematic state and $X_k$, a symmetric and positive definite matrix, denoting the extent state. The kinematic state $x_k=[p_{k,x}, p_{k,y}, \phi_k, v_k, \omega_k]^T$ comprises the position of the object center given by $p_{k,x}$ and $p_{k,y}$, the heading $\phi_k$, the velocity $v_k$, and the yaw rate $\omega_k$. For object with rectangular shape (e.g., vehicles), its length l and width w can be obtained from the eigen-decomposition of $X_k$.

The exemplar probabilistic EOT estimation receives $n_k$ measurements $Z_k=\{z_k^j\}_{j=1}^{n_k}$ at each time step k. The objective of object tracking is to recursively compute the posterior density of the object state $p(\xi_k|Z_{1:k})$ given all measurements $Z_{1:k}=\{Z_1, \ldots, Z_k\}$ up to and including the current time step k using Bayesian estimation. The object state $\xi_k$ with corresponding uncertainty measures can then be extracted from the posterior density $p(\xi_k|Z_{1:k})$.

Given the posterior density $p(\xi_{k-1}|Z_{1:k-1})$ at time step k−1 and the transition density $p(\xi_k|\xi_{k-1})$, the predicted density is given by the prediction step $$p(\xi_k|Z_{1:k-1})=\int p(\xi_{k-1}|Z_{1:k-1})p(\xi_k|\xi_{k-1})d\xi_{k-1}. \qquad (21)$$

This density is then updated using measurements $Z_k$ via the Bayes' rule, $$p(\xi_k|Z_{1:k}) \propto p(\xi_k|Z_{1:k-1})p(Z_k|\xi_k), \qquad (22)$$

where $p(Z_k|\xi_k)=\Pi_{j-1}^{n_k}p(z_k^j|\xi_k)$ is the joint measurement likelihood with $p(z_k^j|\xi_k)$ denoting the spatial distribution. Some implementations approximate the predicted and posterior state densities such that they are all of the same functional form, which allows a recursive use of the prediction and update functions.

Hierarchical Truncation Model

Some embodiments use the hierarchical truncated Gaussian (HTG) spatial distribution for modeling noisy automotive radar measurements. Some embodiments learn this distribution from the offline training data. These embodiments are based on understanding that the measurements are subject to noise. Hence, the measurements can be represented to include sources of the measurements modified with noise. Such a representation allows to learn the structural geometry parameters of the hierarchical truncated Gaussian model from the source of the measurements after removal of the noise.

Figure 14:
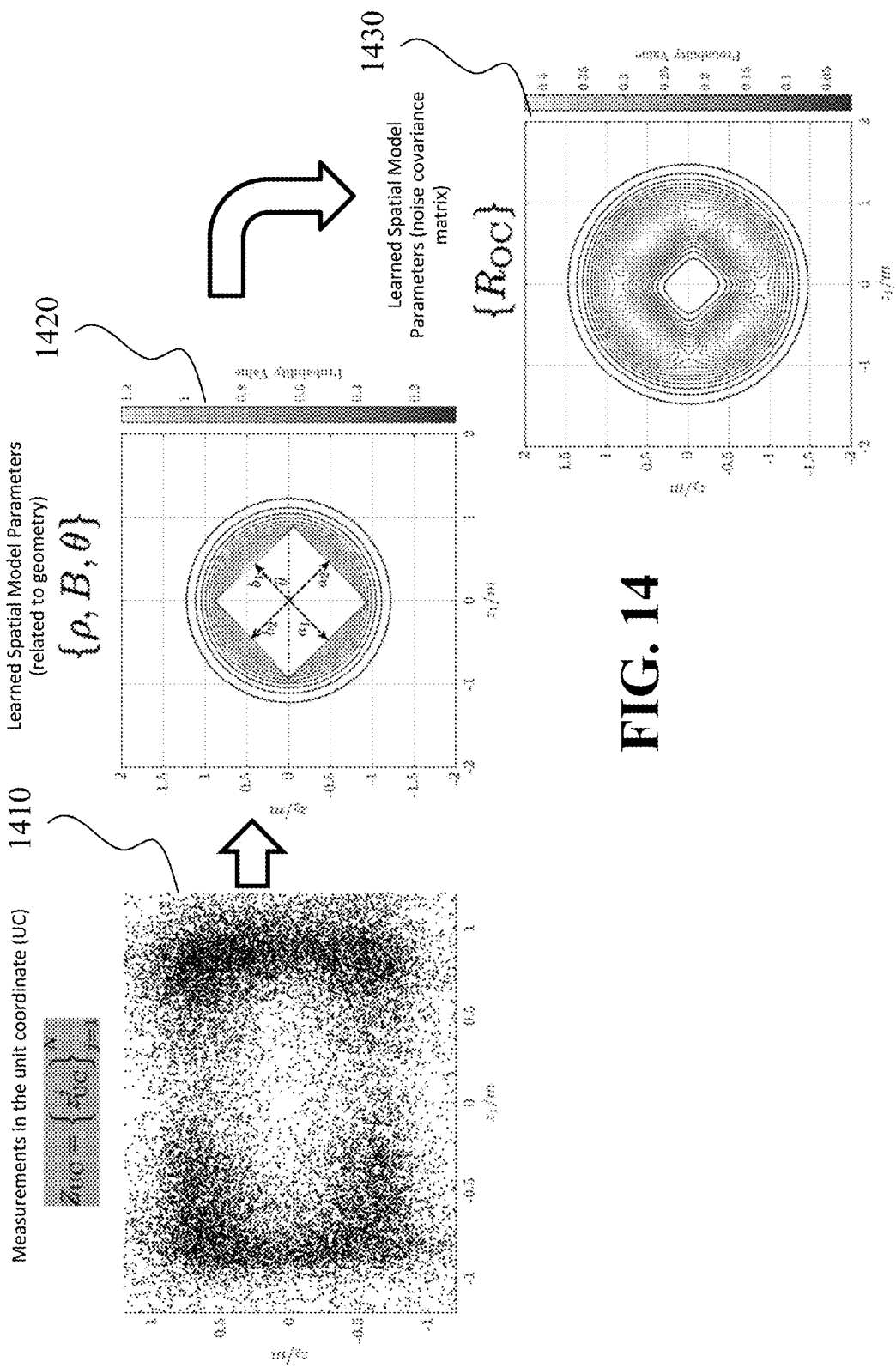
FIG. 14 shows a schematic of evolution of formation of the HTG model according to some embodiments.

FIG. 14 shows a schematic of evolution of formation of the HTG model according to some embodiments. For example, each detection point z 1410 is modeled as a noisy measurement of a noise-free measurement source y. The distribution p(z|y) that models the sensor noise is Gaussian N(z;y,R) where R is the measurement noise covariance matrix. The distribution P(y|ξ) that models the spatial characteristics of the measurement source is a truncated Gaussian with the form $$TN(y; h(x), \rho X, D) = \frac{1_D(y)}{c_D} N(y, h(x), \rho X), \qquad (23)$$

where ρ is a scaling factor, D is the density support, $1_D(\cdot)$ is the indicator function on D, and $c_D$ is the normalization factor such that (23) integrates to one. Note that we use generic D and $c_D$ to symbolize the truncated area and normalization constant involved in the equations for the sake of simplicity, although D and $c_D$ might be changing from equation to equation.

The truncated area 1420 can be fully specified by the object center h(x) the truncation bounds B=[$a_1$, $a_2$, $b_1$, $b_2$], and an orientation θ with respect to the horizontal axis. One or more truncation bounds can be set to infinity to model partial-view measurements caused by the self-occlusion. Also, note that in some implementations, the orientation of the truncated area does not need to be aligned with the object orientation. This leads to a better modeling of the feature that the vehicle wheels and wheel houses are typical measurement sources. An illustrative example of P(y|ξ) is describe by the truncation 1420. The resulting measurement spatial distribution can be computed by marginalizing out the measurement source, $$p(z|\xi) = \int p(z|y)p(y|\xi)dy = \frac{1}{c_D} \int_D N(z; y, R)N(y; h(x), \rho X)dy, \quad (24)$$

For the given truncated Gaussian $p(y|\xi)$ in 1420, the resulting spatial distribution $p(z|\xi)$ 1430 are defined by a given noise covariance matrix R.

Learning Hierarchical Truncated Measurement Model

In some embodiments, the object states are available as ground truth, and that the training data to learn the model include a set of N two-dimensional accumulated data points in a global coordinate system, $$Z_{GC} = \{z_{GC}^j\}_{j=1}^N,$$

generated by a HTG with given parameter values. The parameters of the model are unknown and the objective is therefore to estimate the parameters given the available data. The maximum likelihood (ML) estimate can be obtained by maximizing the joint measurement likelihood with respect to the parameters that the training data $Z_{GC}$ condition on.

Figure 15A:
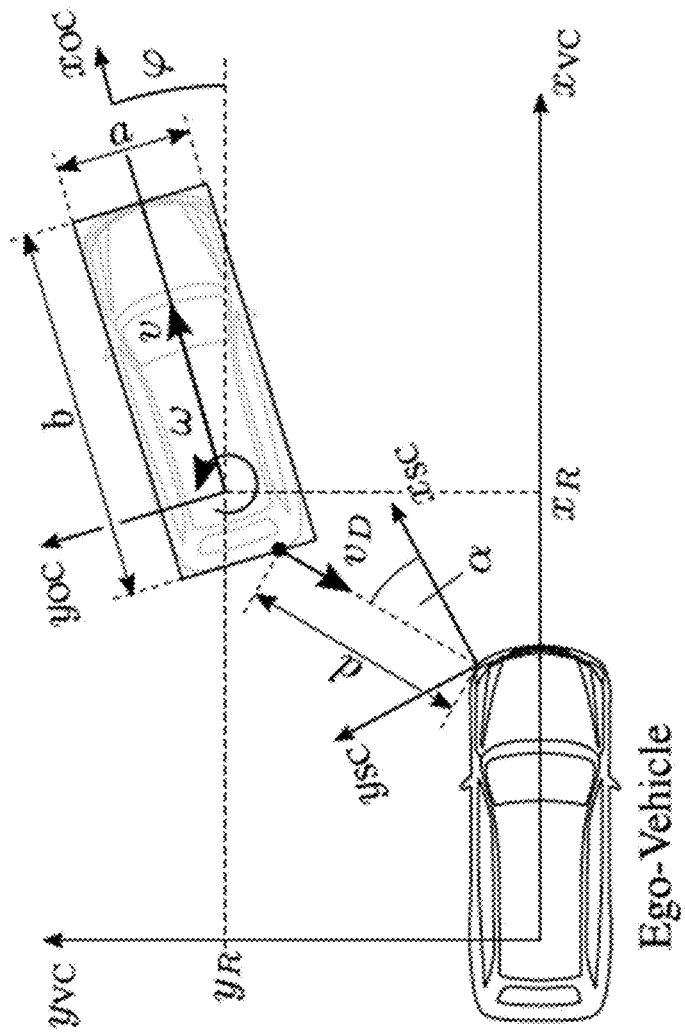
FIG. 15A shows a schematic illustration of the state of an object, the ego-vehicle, and the ego-vehicle (VC), sensor (SC), and object (OC) coordinate systems used by some embodiments.

FIG. 15A shows a schematic illustration of the state of an object, the ego-vehicle, and the ego-vehicle (VC), sensor (SC), and object (OC) coordinate systems used by some embodiments.

Figure 15B:
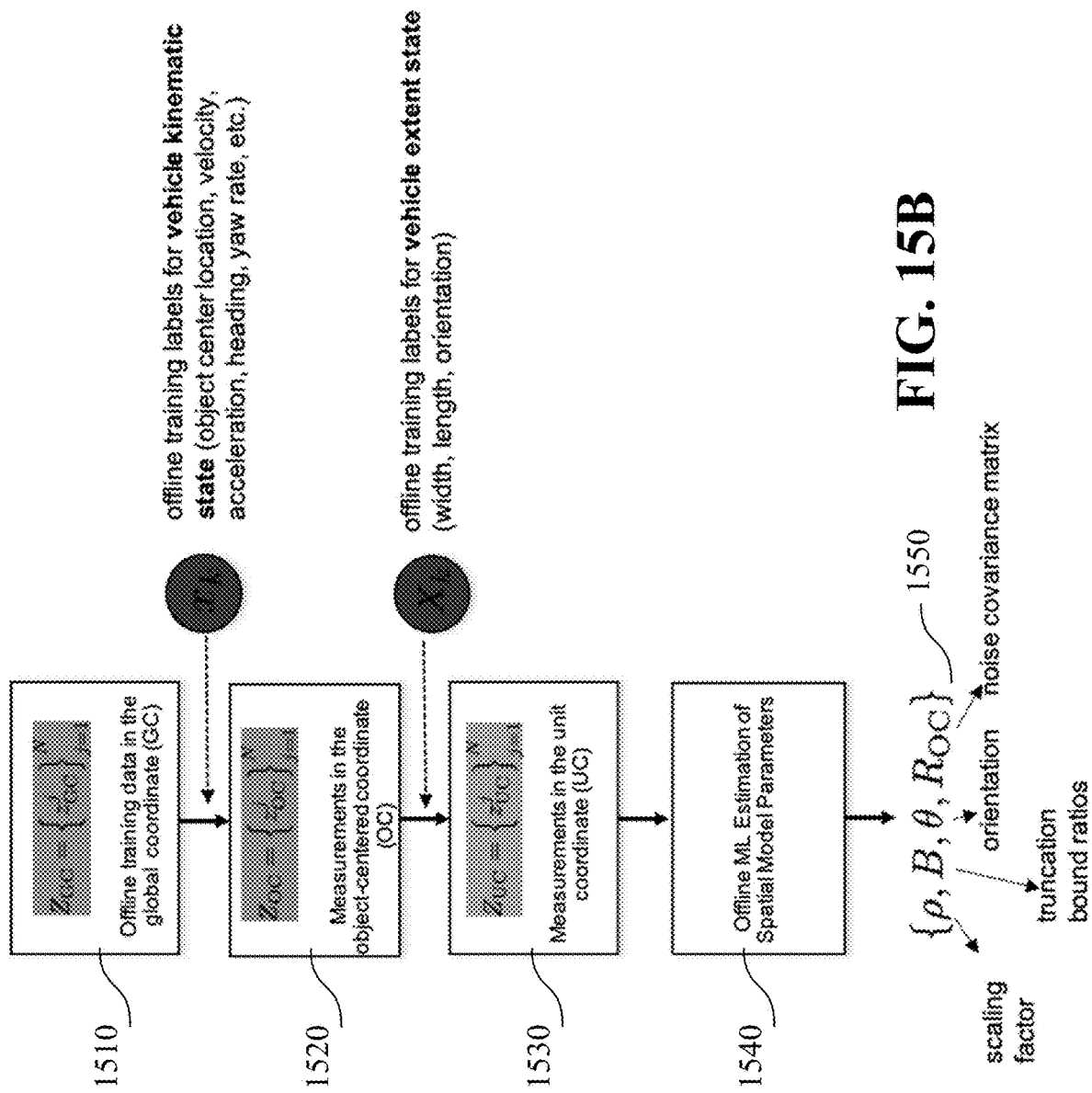
FIG. 15B shows a flow chart of an offline spatial model learning workflow according to some embodiments estimating the parameters of the model for tracking a vehicle.

FIG. 15B shows a flow chart of an offline spatial model learning workflow according to some embodiments estimating the parameters of the model for tracking a vehicle. To obtain a hierarchical truncation model that well describes the spatial characteristics of automotive radar detections from vehicles, the embodiments collect data samples 1510 to account for vehicles of different size and with different poses. To avoid collecting data in such a complex space, one embodiment applies the dimension reduction technique. Specifically, the radar detections in the global ego-vehicle coordinate system are first transformed to the object coordinate system to obtain $Z_{OC} = \{z_{OC}^j\}_{j=1}^N$ 1520. Then the measurements in the normalized unit coordinate (UC) system $$Z_{UC} = \{z_{UC}^j\}_{j=1}^N$$

1530 are given by $$z_{UC} = [2/l, 2/w] z_{OC}, \quad (25)$$

After the dimension reduction, the positions of all vehicle detections are transformed to a normalized object coordinate system that are independent of the object states, e.g., the position, length and width.

Next, the embodiments perform offline ML estimation of spatial model parameters 1540. The ML estimate for the coordinate-transformed training data is given by $$\operatorname*{argmax}_{\rho,B,\theta,R_{OC}} \frac{1}{c_D^N} \prod_{z_{UC} \in Z_{UC}} \int_D N(z_{UC}; y, R_{OC}) N(y; 0_{2\times 1}, \rho I_2) dy, \quad (26)$$

where $I_2$ is an identity matrix. Computing (26) involves evaluating the convolution of a bivariate truncated Gaussian and a bivariate Gaussian, which is intractable in general. To obtain a tractable solution of (26), some embodiments use the noise covariance $R_{OC}$ in the normalized object coordinate in the form $$R_{OC} = M(\theta) \operatorname{diag}([r_1, r_2]) M(\theta)^T, \quad (27)$$

where $M(\theta)$ is the clockwise rotation matrix. Obtaining the ML estimate of (26) is then equivalent to obtaining $$\operatorname*{argmin}_{\rho,B,\theta,r_1,r_2} - \sum_{z_{UC} \in Z_{UC}} \log \int_D N(y; 0_{2\times 1}, \rho I_2) \times N(M(-\theta) z_{UC}; y, \operatorname{diag}([r_1, r_2])) dy + \quad (28)$$

$$N \log c_D,$$

where the embodiments further transform the measurements $Z_{UC}$ to a new coordinate system such that the orientation of the truncated area is now aligned with the axis and that the transformed noise covariance is a diagonal matrix.

With the new parameterization, the above cost function of the ML estimation can be computed as a product of two univariate Gaussians and, hence, decoupled. Specifically, the equation (28) can be rewritten by applying the convolution formula as $$\operatorname*{argmin}_{\rho,B,\theta,r_1,r_2} - \sum_{[\tilde{z}_x,\tilde{z}_y]^T \in Z_{UC}} \log(N(\tilde{z}_x; 0, r_1 + \rho) \times N(\tilde{z}_y; 0, r_2 + \rho) - \quad (29)$$

$$\lambda(\tilde{z}_x, a_1, b_1, r_1) \times \lambda(\tilde{z}_y, a_2, b_2, r_2)(1 - c_D)) + N \log c_D,$$

$$\text{s.t.} \rho \in (0, 1], \theta \in [-\pi/2, \pi/2], \{B, r_1, r_2\} \in [0, \infty),$$

and $$[\tilde{z}_x, \tilde{z}_y] = [\cos(\theta) z_x' + \sin(\theta) z_y', -\sin(\theta) z_x' + \cos(\theta) z_y'], c_D =$$

$$1 - ((\Phi(b_1 \rho^{-1/2}) - \Phi(-a_1 \rho^{1/2})) \times (\Phi(b_2 \rho^{-1/2}) - \Phi(-a_2 \rho^{-1/2}))) \lambda(\tilde{z}, a, b, r) =$$

$$\gamma(a, b, r) \left( \Phi\left(\frac{\tilde{z} + a - E(\tilde{z}, r)}{\beta(r)}\right) - \Phi\left(\frac{\tilde{z} - b - \varepsilon(\tilde{z}, r)}{\beta(r)}\right) \right) \exp\left(-\frac{\tilde{z}\tilde{z}}{2(r+\rho)}\right),$$

$$\varepsilon(\tilde{z}, r) = r\tilde{z}(r+\rho)^{-1}, \beta(r) = r^{1/2} \rho^{1/2} (r+\rho)^{-1},$$

$$\gamma(a, b, r) = \frac{\sqrt{2\pi} \beta(r)}{2\pi r^{1/2} \rho^{1/2} (\Phi(-b\rho^{-1/2}) - \Phi(a\rho^{-1/2}))},$$

with $\Phi(\cdot)$ denoting the cumulative density function (CDF) of a standard normal distribution. The ML estimate of all or some of the unknown parameters 1550 can be found, e.g., by using the coordinate descent optimization which iteratively determines a coordinate (one of unknown parameters here) and minimizes the cost function of (29) over the selected coordinate with proper constraints (e.g., the bounds B are non-negative) while fixing all other coordinates.

Measurement Model Dependence on Aspect Angles

Automotive radar measurements are likely reflected from parts of the vehicle that are in sight of the radar sensor. To account for this self-occlusion feature, some embodiments split the training data set into groups according to the annotated aspect angle in the training dataset $$\phi' = \phi_{SC} - a \tan 2(p_{y,SC}, p_{x,SC}), \quad (30)$$

where $\phi_{SC}$ and $[p_{x,SC}, p_{y,SC}]^T$, respectively, denote the object orientation and center position in the sensor coordinate system. Then the conditional measurement models on the aspect angle can be learning using the above ML estimation. As used herein, an aspect angle in the sensor coordinate (SC) system is the relative angle of the object with respect with respect to the sensor itself. As an illustrative example, the aspect angle in the SC system in FIG. 15A is given by the angle α. For the offline learning, since we translate the automotive radar measurements into the unit coordinate (UC) system, the aspect angle in the UC system is the difference between the angle φ in the OC system and the angle α in the SC system.

Figure 16A:
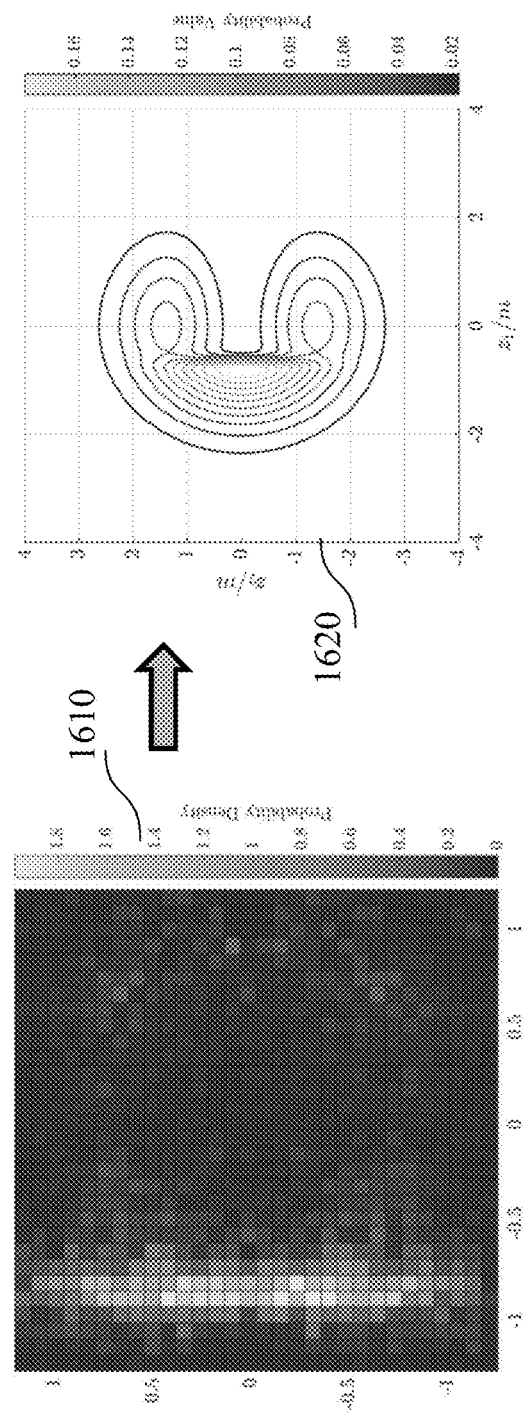
FIGS. 16A and 16B show examples of learning measurement model for different aspect angles according to some embodiments.
Figure 16B:
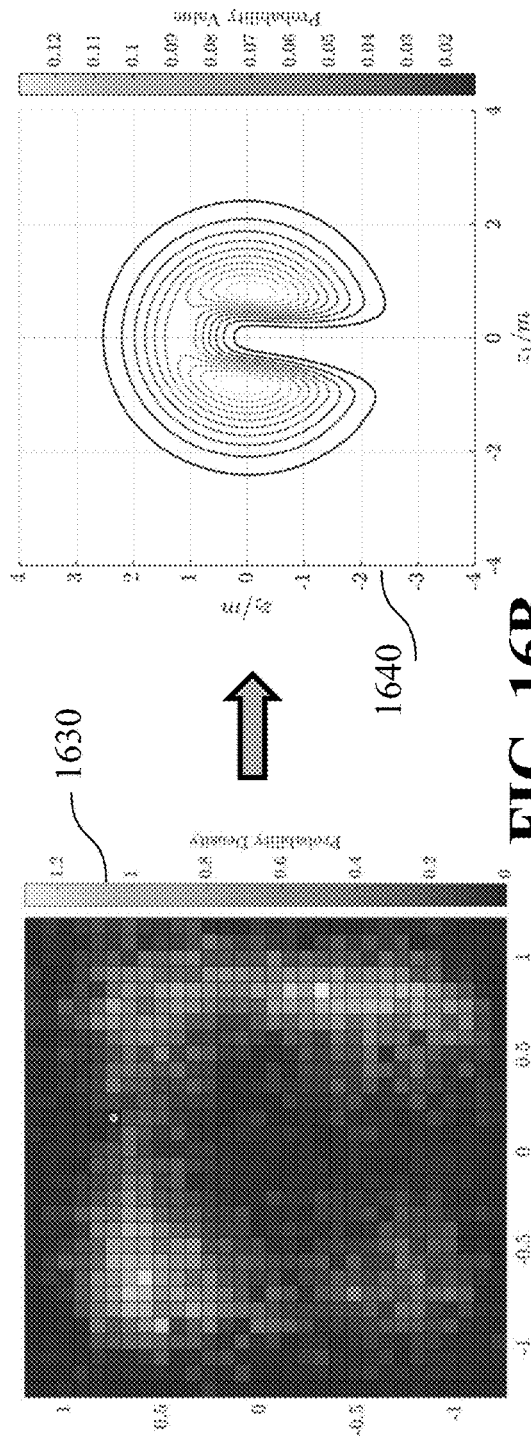

FIGS. 16A and 16B show examples of learning measurement model for different aspect angles according to some embodiments. For example, a model 1620 is learned from the measurements 1610, while the model 1640 is learned from the measurements 1630. The measurements 1610 and 1630 are partial-view measurements corresponding to different type of occlusion, e.g., annotated by different aspect angles.

In such a manner, different values of the truncation intervals are predetermined for different types of an occlusion of the object with respect to the sensor, which allows the processor to update the selection of the current values of the truncation intervals in response to detecting a change in a type of the occlusion.

Figure 17:
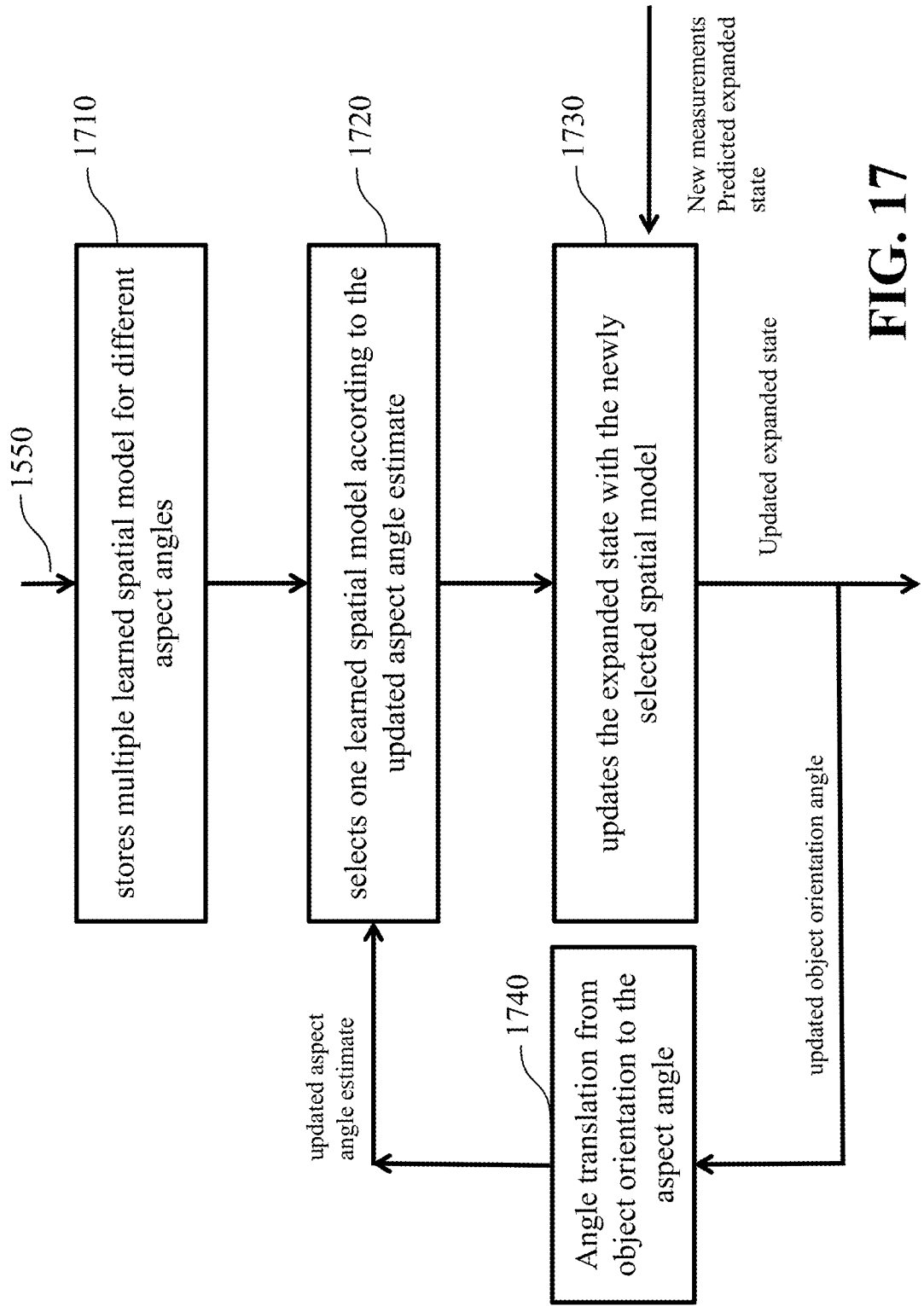
FIG. 17 shows a block diagram of a method for tracking the extended state of an object according to one embodiment.

FIG. 17 shows a block diagram of a method for tracking the extended state of an object according to one embodiment. In this embodiment, the memory stores 1710 multiple learned spatial models along with associated parameters from 1550 for different aspect angles learned from the training data. Within a current iteration of the execution of the probabilistic filter, the embodiment translates 1740 the object orientation angle (one element in the expanded state) to corresponding aspect angle, and selects 1720 from the memory the learned spatial model for the updated aspect angle. Along with new measurements and predicted expanded state, the embodiment computes the likelihood function using the selected spatial model and updates 1730 the expanded state. For the next iteration, the object orientation angle in the expanded state is translated 1740 again and the above process repeats.

Random Matrix Approach for Learned Hierarchical Truncation Model

In various embodiments, the probabilistic filter iteratively uses the motion model to predict the expanded state and uses the measurement model to update the expanded state predicted by the motion model using random matrix (RM) update of the expanded state of the object, as described above. Additionally, or alternatively, some embodiments modify the RM approach with the learned hierarchical truncation model. The modified RM approach replaces the online bound update by the learned spatial model. In particular, the modified RM uses a new RM state update step. It is assumed that both the predicted and posterior densities have the factorized form $$p(\xi_k | Z'_{1:k}) \approx p(x_k | Z'_{1:k}) p(X_k | Z'_{1:k}) = \qquad (31)$$
$$N(x_k; m'_{k|k}, P'_{k|k}) W(X_k; v'_{k|k}, V'_{k|k}),$$

where $k' \in \{k-1, k\}$. The kinematic state $x_k$ is Gaussian distributed with mean $m_{k|k'}$ and covariance matrix $P_{k|k'}$, whereas the extent matrix $X_k$ is inverse-Wishart distributed with $v_{k|k'}$ degrees of freedom and scale matrix $V_{k|k'}$.

Figure 18:
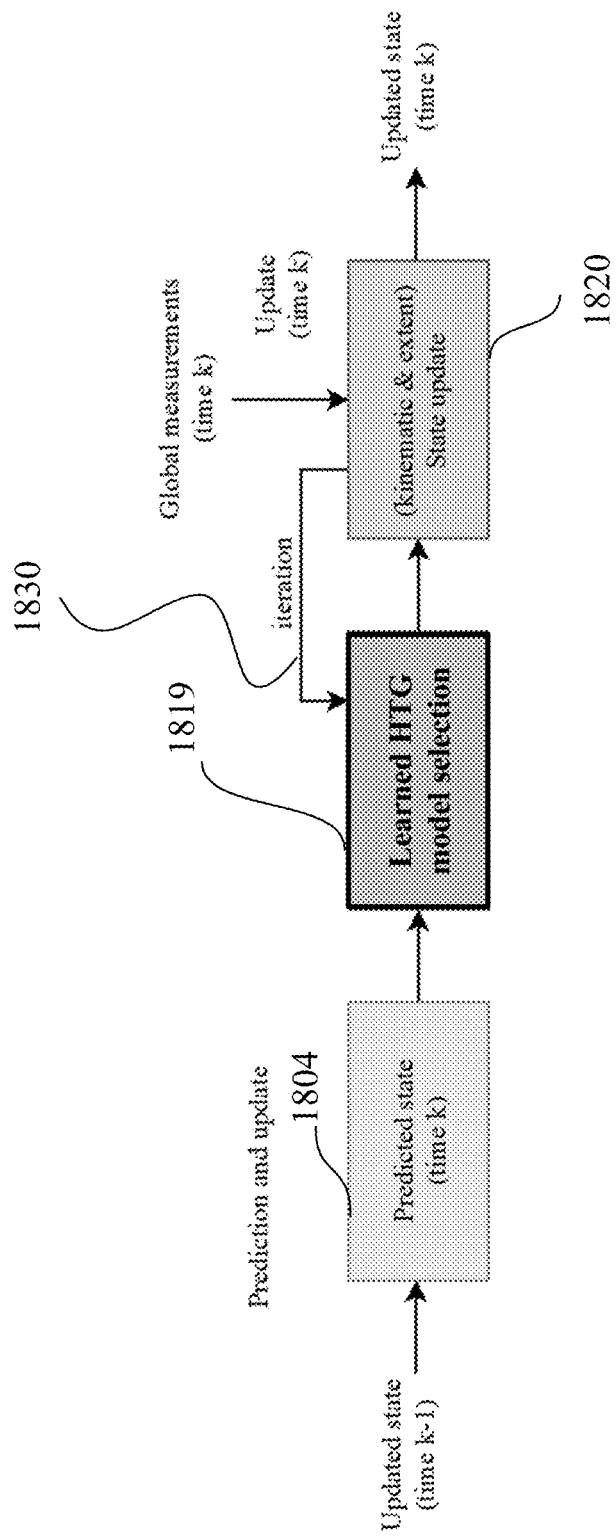
FIG. 18 shows a block diagram of a random matrix (RM) update of the expanded state of the moving object according to some embodiments.

FIG. 18 shows a block diagram of a random matrix (RM) update of the expanded state of the moving object according to some embodiments. During the prediction step 1804, the state transition density is approximated as a product of Gaussian and Wishart distributions $$p(\xi_k | \xi_{k-1}) \approx p(x_k | x_{k-1}) p(X_k | X_{k-1}, x_{k-1}) = N(x_k; g(x_{k-1}), Q) W \\ (X_k; \kappa_{k-1} E_{x_{k-1}} X_{k-1} E_{x_{k-1}}^T / \kappa_{k-1}), \qquad (32)$$

where g(•) denotes the (nonlinear) motion model, Q denotes the process noise covariance and $E_x$ denotes the transformation matrix, typically a rotation matrix depending on kinematic state x. Given the state transition density (32) and the posterior density $p(\xi_{k-1} | Z_{1:k-1})$ in (31), the predicted parameters $\{m, P, v, V\}_{k|k-1}$ of $p(\xi_k | Z_{1:k-1})$ are $$m_{k|k-1} = g(m_{k-1|k-1}), \qquad (33)$$

$$P_{k|k-1} = G_{k-1} P_{k-1|k-1} G_{k-1}^T + Q_{k-1}, \qquad (34)$$

$$v_{k|k-1} = 6 + e^{-T_s/\tau} (v_{k-1|k-1} - 6), \qquad (35)$$

$$V_{k|k-1} = e^{-T_s/\tau} E_{m_{k-1}} V_{k-1|k-1} E_{m_{k-1}}^T, \qquad (36)$$

where $G_{k-1} = \nabla_x g(x)|_{x=m_{k-1|k-1}}$, $T_s$ is the sampling time and τ is a maneuvering correlation constant. The kinematic state prediction in (33) and (34) follows the prediction step of a (nonlinear) Kalman filter, whereas the extent state prediction is given by (35) and (36).

As the learned HTG measurement model 1819 depends on the object state, the object state is updated 1820 in a recursive fashion. The complete state update step for the learned hierarchical truncation model runs iteratively 1830 over two building blocks: 1) selecting a learned hierarchical truncation model conditioned on the aspect angle, and 2) object state update using converted measurement statistics, until a convergence criteria is met. From one iteration to the next, a refined HTG model can be obtained by having a more accurate object state estimate.

Specifically, at the t-th iteration, some embodiments first compute the aspect angle (10) using the updated object state $\xi_{k|k}^{(t-1)}$ estimated at the (t−1)-th iteration, and then select a learned HTG measurement model. The RM approach uses the statistics (mean and spread) of Gaussian distributed measurements to update the predicted state density. To integrate the HTG measurement model into the state update step of RM, an effective way is to construct Gaussian measurement statistics using the HTG distributed measurements.

The procedure is given as follows. The embodiments first compute the analytical mean and spread of $n_k^c = n_k(1-c_{D_k})/c_{D_k}$ pseudo measurements that follow a truncated Gaussian distribution with density support $D_k^c = R^2 \setminus D_k$. Next, the embodiments convert the learned sensor noise covariance $R_{OC}$ and the computed pseudo measurement statistics from normalized object coordinate system to the global coordinate system using $\xi_{k|k}^{(t-1)}$. Then the embodiments can take the weighted sum of the transformed pseudo measurement mean/spread and the received measurement mean/spread to obtain the converted Gaussian measurement mean $\bar{z}_k$ and spread $\Sigma_k$. Given the learned HTG model and the predicted density $p(\xi_k | Z_{1:k-1})$, the updated parameters $\{m, P, v, V\}_{k|k}$ determining the posterior density are given as:

$$m_{k|k} = m_{k|k-1} + K\varepsilon, \qquad (37)$$

$$P_{k|k} = P_{k|k-1} - KHP_{k|k-1}, \qquad (38)$$

$$v_{k|k} = v_{k|k-1} + (n_k + n_k^c), \qquad (39)$$

$$V_{k|k} = V_{k|k-1} + \hat{N} + \hat{Z}, \qquad (40)$$

where $$\hat{N} = \hat{X}^{1/2} S^{-1/2} \varepsilon \varepsilon^T S^{-T/2} \hat{X}^{T/2}, \varepsilon \bar{z}_k - Hm_{k|k-1}$$

$$\hat{Z} = \hat{X}^{1/2} \hat{R}^{-1/2} \Sigma_k \hat{R}^{-T/2} \hat{X}^{T/2},$$

$$\hat{R} = \rho \hat{X} + R, \hat{X} = V_{k|k-1}/(v_{k|k-1} - 6),$$

$$S = HP_{k|k-1} H^T + \hat{R}(n_k + n_k^c), K = P_{k|k-1} HS^{-1}.$$

At the first iteration, we may use the predicted state estimate at time step k to initialize the algorithm by setting $\xi_{k|k}^{(0)} = \xi_{k|k-1}$.

Compared with an previous update step in unmodified RM, the update step for the learned HTG model directly uses the offline learned model parameters B, θ, ρ and R. This makes the new update step computationally simpler as it skips the bounds update and converges faster. By incorporating the learned measurement model into the update step, the proposed method also shows improved capability of EOT with sparse measurements.

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A system for tracking an expanded state of a moving object including a kinematic state indicative of a position of the object and an extended state indicative of one or combination of a dimension and an orientation of the object, the system comprising:
    at least one sensor configured to probe a scene including a moving object with one or multiple signal transmissions to produce one or multiple measurements of the object per the transmission;
    a memory configured to store instructions;
    a processor configured to execute the instructions to execute a probabilistic filter tracking a joint probability of the expanded state of the object estimated by a motion model of the object and a measurement model of the object, wherein the measurement model includes a center-truncated distribution having truncation intervals providing smaller probability for the measurements at the center of the center-truncated distribution inside of the truncation intervals and larger probability for the measurements outside of the truncation intervals, wherein the center-truncated distribution is a truncation of an underlying untruncated distribution according to the truncation intervals, wherein the probabilistic filter is configured to estimate the center-truncated distribution that fits the measurements and to produce mean and variance of the underlying untruncated distribution corresponding to the center-truncated distribution, such that the mean of the underlying untruncated distribution indicates the position of the object in the expanded state and the variance of the underlying untruncated distribution indicates the dimension and the orientation of the object in the expanded state; and
    an output interface configured to output the expanded state of the object.

2. The system of claim 1, wherein the measurement model includes a hierarchical truncated Gaussian model with structural geometry parameters learned from training data, wherein the structural geometry parameters include the truncation intervals, wherein the probabilistic filter is one or combination of a Bayesian filter, a Kalman filter, and a particle filter, and wherein the joint probability is a posterior probability conditioned on the expanded state estimated during previous iterations of the probabilistic filter.

3. The system of claim 2, wherein the training data include different measurements of different motions of different objects, and wherein the structural geometry parameters are learned using machine learning by transforming the training data into a common unit coordinate system.

4. The system of claim 2, wherein the structural geometry parameters learned from the training data include truncation bounds defining an extend of the truncation intervals, an orientation of the truncation intervals with respect to an orientation of the object.

5. The system of claim 4, wherein the measurements are subject to noise, such that the measurements include source of the measurements modified with noise, and wherein the structural geometry parameters of the hierarchical truncated Gaussian model are learned from the source of the measurements after removal of the noise.

6. The system of claim 4, wherein the noise is defined by a noise covariance matrix learned from the training data, such that the hierarchical truncated Gaussian model includes the center-truncated distribution spread according to the noise covariance matrix.

7. The system of claim 3, wherein the memory stores multiple measurement models having different values of the truncation intervals learned for different aspect angles in the training data, and wherein, within a current iteration of the execution of the probabilistic filter, the processor selects from the memory a current measurement model with current values of the truncation intervals based on the measurements collected during a previous iteration of the probabilistic filter and updates the expanded state with the current measurement model having the center-truncated distribution with the current values of the truncation intervals.

8. The system of claim 7, wherein the different values of the truncation intervals are predetermined for different types of an occlusion of the object with respect to the sensor, such that the processor updates the selection of the current values of the truncation intervals in response to detecting a change in a type of the occlusion.

9. The system of claim 7, wherein at least one of the truncation intervals is an open-ended interval ending in infinity.

10. The system of claim 3, wherein the motion model predicts the expanded state of the object subject to fixed values of the dimension of the object and varying orientation of the object, such that the dimension of the object is updated only by the measurement model, while the orientation of the object is updated by both the motion model and the measurement model.

11. The system of claim 1, wherein the execution of the measurement model outputs a covariance matrix fitting the measurements, wherein diagonal elements of the covariance matrix define the dimension of the object, and wherein off-diagonal elements of the covariance matrix define the orientation of the object.

12. The system of claim 1, wherein the underlying untruncated distribution is a Gaussian distribution and the center-truncated distribution is a center-truncated Gaussian distribution.

13. The system of claim 1, wherein the probabilistic filter iteratively uses the motion model to predict the expanded state and uses the measurement model to update the expanded state predicted by the motion model using random matrix-based update of the expanded state of the object.

14. The system of claim 13, wherein the random matrix-based updates the expanded state of the object iteratively to converge to statistics of distribution of the measurements.

15. The system of claim 1, wherein the measurements are subject to noise defined by the noise covariance matrix, wherein the truncation intervals are determined for sources of the measurements without the noise, and wherein the probabilistic filter is configured to remove the noise from the measurements before evaluating likelihoods of the noise-free sources of the measurements according to the center-truncated distribution, such that the probabilistic filter generates the center-truncated distribution that fits the noise-free sources of the measurements.

16. The system of claim 1, wherein the measurements are subject to noise, wherein the truncation intervals are determined directly for the measurements, and wherein the probabilistic filter is configured to evaluate likelihoods of the measurements according to the hierarchical center-truncated distribution, such that the probabilistic filter generates the hierarchical center-truncated distribution that fits the measurements.

17. The system of claim 1, wherein the object is a vehicle, and wherein the expanded state update includes scan-aggregation of measurements transformed from a global coordinate system to a local coordinate system of the vehicle.

18. The system of claim 17, wherein the memory is configured to store a model of the vehicle including the motion model of the object subject to process noise and the measurement model of the object subject to measurement noise, such that one or combination of the process noise and the measurement noise bounds an uncertainty of the expanded state of the vehicle; and wherein the processor is configured to determine a control input to a controller of a vehicle using the model of the vehicle with the expanded state having bounded uncertainty, and control the vehicle according to the control input.

* * * * *